United States Patent
Saraee et al.

(10) Patent No.: US 12,293,294 B2
(45) Date of Patent: May 6, 2025

(54) SYSTEMS AND METHODS FOR IMAGE OR VIDEO PERFORMANCE HEAT MAP GENERATION

(71) Applicant: Vizit Labs, Inc., Boston, MA (US)

(72) Inventors: Elham Saraee, Jamaica Plain, MA (US); Jehan Hamedi, South Boston, MA (US); Zachary Halloran, Braintree, MA (US); Arsenii Mustafin, Boston, MA (US)

(73) Assignee: VIZIT LABS, INC., Boston, MA (US)

( * ) Notice: Subject to any disclaimer, the term of this patent is extended or adjusted under 35 U.S.C. 154(b) by 985 days.

(21) Appl. No.: 17/316,503

(22) Filed: May 10, 2021

(65) Prior Publication Data
US 2021/0264161 A1    Aug. 26, 2021

Related U.S. Application Data

(63) Continuation-in-part of application No. 16/236,298, filed on Dec. 28, 2018, now Pat. No. 11,301,718.

(51) Int. Cl.
*G06N 3/084* (2023.01)
*G06N 3/08* (2023.01)
(Continued)

(52) U.S. Cl.
CPC ............ *G06N 3/084* (2013.01); *G06N 3/08* (2013.01); *G06Q 30/0277* (2013.01);
(Continued)

(58) Field of Classification Search
CPC ...... G06N 3/084; G06N 3/08; G06Q 30/0277; G06Q 30/0269; G06T 11/001;
(Continued)

(56) References Cited

U.S. PATENT DOCUMENTS

| 8,494,897 B1 | 7/2013 | Dawson |
| 8,909,563 B1 | 12/2014 | Jing et al. |

(Continued)

OTHER PUBLICATIONS

Lu et al., "RAPID: Rating Pictorial Aesthetics using Deep Learning," (2014), Proceedings of the 22nd ACM international conference on Mulitmedia.

(Continued)

*Primary Examiner* — Li B. Zhen
*Assistant Examiner* — Henry Nguyen
(74) *Attorney, Agent, or Firm* — FOLEY & LARDNER LLP

(57) ABSTRACT

A method is disclosed. The method may include receiving an image or video; extracting a plurality of features from the image or video; executing a neural network using the plurality of features to obtain a performance score for the image or video, the neural network comprising an input layer, a plurality of intermediate layers subsequent to the input layer, and a regression layer or a classification layer; extracting values from one or more signals between an intermediate layer and the regression layer or the classification layer; for each of the plurality of features, calculating, based on at least one of the one or more values, an impact score indicating an impact the feature had on the performance score; and generating, based on one or more impact scores for the plurality of features, indications indicating an impact different features of the image or video had on the performance score.

17 Claims, 9 Drawing Sheets

(51) Int. Cl.
  *G06Q 30/0241* (2023.01)
  *G06T 11/00* (2006.01)
  *G06T 11/60* (2006.01)
  *G06V 10/764* (2022.01)
  *G06V 10/776* (2022.01)
  *G06V 20/40* (2022.01)

(52) U.S. Cl.
  CPC ............ *G06T 11/001* (2013.01); *G06T 11/60* (2013.01); *G06V 10/764* (2022.01); *G06V 10/776* (2022.01); *G06V 20/46* (2022.01)

(58) Field of Classification Search
  CPC ....... G06T 11/60; G06T 11/00; G06V 10/764; G06V 10/776; G06V 20/46; G06F 18/2413
  See application file for complete search history.

(56) References Cited

U.S. PATENT DOCUMENTS

| | | |
|---|---|---|
| 9,996,890 B1 | 6/2018 | Cinnamon et al. |
| 10,176,198 B1* | 1/2019 | Dhua .................. G06V 10/761 |
| 10,176,396 B2* | 1/2019 | Smyth .................... G06V 10/25 |
| 10,410,108 B2 | 9/2019 | Shaji et al. |
| 10,637,826 B1 | 4/2020 | Luo et al. |
| 10,861,077 B1 | 12/2020 | Liu et al. |
| 10,872,228 B1 | 12/2020 | Zhou et al. |
| 11,087,273 B1 | 8/2021 | Bergamo |
| 2012/0030711 A1 | 2/2012 | Rae et al. |
| 2014/0086487 A1* | 3/2014 | Hao ....................... G06V 20/10 382/173 |
| 2016/0098844 A1 | 4/2016 | Shaji et al. |
| 2016/0132749 A1* | 5/2016 | Smyth ..................... G06T 7/90 382/162 |
| 2016/0335120 A1 | 11/2016 | Gupta et al. |
| 2017/0024761 A1 | 1/2017 | Ruiz et al. |
| 2017/0069327 A1* | 3/2017 | Heigold .................. G10L 17/04 |
| 2017/0098165 A1 | 4/2017 | Yang et al. |
| 2017/0221075 A1 | 8/2017 | Wang et al. |
| 2017/0337687 A1* | 11/2017 | Wang ........................ G06T 7/11 |
| 2018/0011876 A1 | 1/2018 | Li et al. |
| 2018/0040019 A1 | 2/2018 | Gavlovski et al. |
| 2018/0108440 A1 | 4/2018 | Stevens et al. |
| 2018/0174190 A1 | 6/2018 | Ferreira et al. |
| 2018/0211333 A1 | 7/2018 | Lackman et al. |
| 2019/0007425 A1 | 1/2019 | Butler et al. |
| 2019/0026609 A1 | 1/2019 | Shen et al. |
| 2019/0026786 A1 | 1/2019 | Khoury et al. |
| 2019/0043241 A1 | 2/2019 | Scheff et al. |
| 2019/0080176 A1 | 3/2019 | Lan et al. |
| 2019/0080456 A1 | 3/2019 | Song et al. |
| 2019/0108399 A1* | 4/2019 | Escorcia .................. G06F 18/24 |
| 2019/0132414 A1 | 5/2019 | Bongaarts et al. |
| 2019/0147340 A1 | 5/2019 | Zhang et al. |
| 2019/0156204 A1 | 5/2019 | Bresch et al. |
| 2019/0200797 A1 | 7/2019 | Diao et al. |
| 2019/0205620 A1 | 7/2019 | Yi et al. |
| 2019/0245925 A1 | 8/2019 | Yamamoto |
| 2019/0251446 A1 | 8/2019 | Fang et al. |
| 2019/0294729 A1* | 9/2019 | Jiang .................. G06F 16/7844 |
| 2019/0355008 A1 | 11/2019 | Sewak |
| 2020/0107070 A1* | 4/2020 | Lopatecki ................ G06N 3/08 |
| 2020/0126533 A1* | 4/2020 | Doyle .................. G10L 15/063 |
| 2020/0143204 A1* | 5/2020 | Nakano .................. G06V 10/82 |
| 2021/0082136 A1* | 3/2021 | Nikitidis .............. G06V 40/172 |
| 2021/0117948 A1 | 4/2021 | Voss |
| 2022/0051020 A1* | 2/2022 | Jha .......................... G06T 11/20 |
| 2022/0198258 A1* | 6/2022 | Doggett ................... G06N 3/08 |

OTHER PUBLICATIONS

Selvaraju, et al. "Grad-CAM: Visual Explanations from Deep Networks via Gradient-based Localization," (2017), 2017 IEEE International Conference on Computer Vision pp. 618-626.

* cited by examiner ance score.
SYSTEMS AND METHODS FOR IMAGE OR VIDEO PERFORMANCE HEAT MAP GENERATION

CROSS-REFERENCE TO RELATED APPLICATIONS

This application claims the benefit of priority as a continuation-in-part to U.S. application Ser. No. 16/236,298, filed on Dec. 28, 2018, which is incorporated by reference herein in its entirety.

BACKGROUND

Many people use the internet every day. Some use it to discover information such as news, recipes, phone numbers, etc. Some use the internet to communicate with others through mediums such as chat rooms, message boards, and e-mail. Traffic on the internet is large and many people use the internet for extended amounts of time.

Users of the internet may also use the internet to such a degree that advertisers can effectively market goods and services to customers or potential customers using the internet. For example, a host or administrator of a website may place advertisements on popular pages of their website. Such advertisements may be related to other parts of the website or goods that can be purchased that are related to the website. In another example, such advertisements can be unrelated to the website. For example, the website host or administrator may sell space to advertise on and within the website to third parties, much like a billboard might sell or lease ad space to third parties who would like passersby to see the advertisement.

SUMMARY

In accordance with some aspects of the disclosure, a method is disclosed. The method may include receiving, by one or more processors, an image or video; extracting, by the one or more processors, a plurality of features from the image or video; executing, by the one or more processors, a neural network using the plurality of features to obtain a performance score for the image or video, the neural network comprising an input layer, a plurality of intermediate layers subsequent to the input layer, and a regression layer or a classification layer subsequent to the plurality of intermediate layers; extracting, by the one or more processors, one or more values from one or more signals between an intermediate layer of the plurality of intermediate layers and the regression layer or the classification layer, the one or more values generated responsive to executing the neural network using the extracted plurality of features; for each of the plurality of features, calculating, by the one or more processors and based on at least one of the one or more values, an impact score indicating an impact the feature had on the performance score; and generating, by the one or more processors and based on one or more impact scores for the plurality of features, indications indicating an impact different features of the image or video had on the performance score.

In accordance with some aspects of the disclosure, a system is disclosed. The system may include one or more hardware processors configured by machine-readable instructions to: receive an image or video; extract a plurality of features from the image or video; execute a neural network using the plurality of features to obtain a performance score for the image or video, the neural network comprising an input layer, a plurality of intermediate layers subsequent to the input layer, and a regression layer or a classification layer subsequent to the plurality of intermediate layers; extract one or more values from one or more signals between an intermediate layer of the plurality of intermediate layers and the regression layer or the classification layer, the one or more values generated responsive to executing the neural network using the extracted plurality of features; for each of the plurality of features, calculate, based on at least one of the one or more values, an impact score indicating an impact the feature had on the performance score; and generate, based on one or more impact scores for the plurality of features, indications indicating an impact different features of the image or video had on the performance score.

In accordance with some aspects of the disclosure a non-transitory computer-readable storage medium is disclosed. The non-transitory computer-readable storage medium may have instructions embodied thereon that, upon being executed by one or more processors, cause the one or more processors to perform a method, the method comprising: receiving an image or video; extracting a plurality of features from the image or video; executing a neural network using the plurality of features to obtain a performance score for the image or video, the neural network comprising an input layer, a plurality of intermediate layers subsequent to the input layer, and a regression layer or a classification layer subsequent to the plurality of intermediate layers; extracting one or more values from one or more signals between an intermediate layer of the plurality of intermediate layers and the regression layer or the classification layer, the one or more values generated responsive to executing the neural network using the extracted plurality of features; for each of the plurality of features, calculating, based on at least one of the one or more values, an impact score indicating an impact the feature had on the performance score; and generating, based on one or more impact scores for the plurality of features, indications indicating an impact different features of the image or video had on the performance score.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
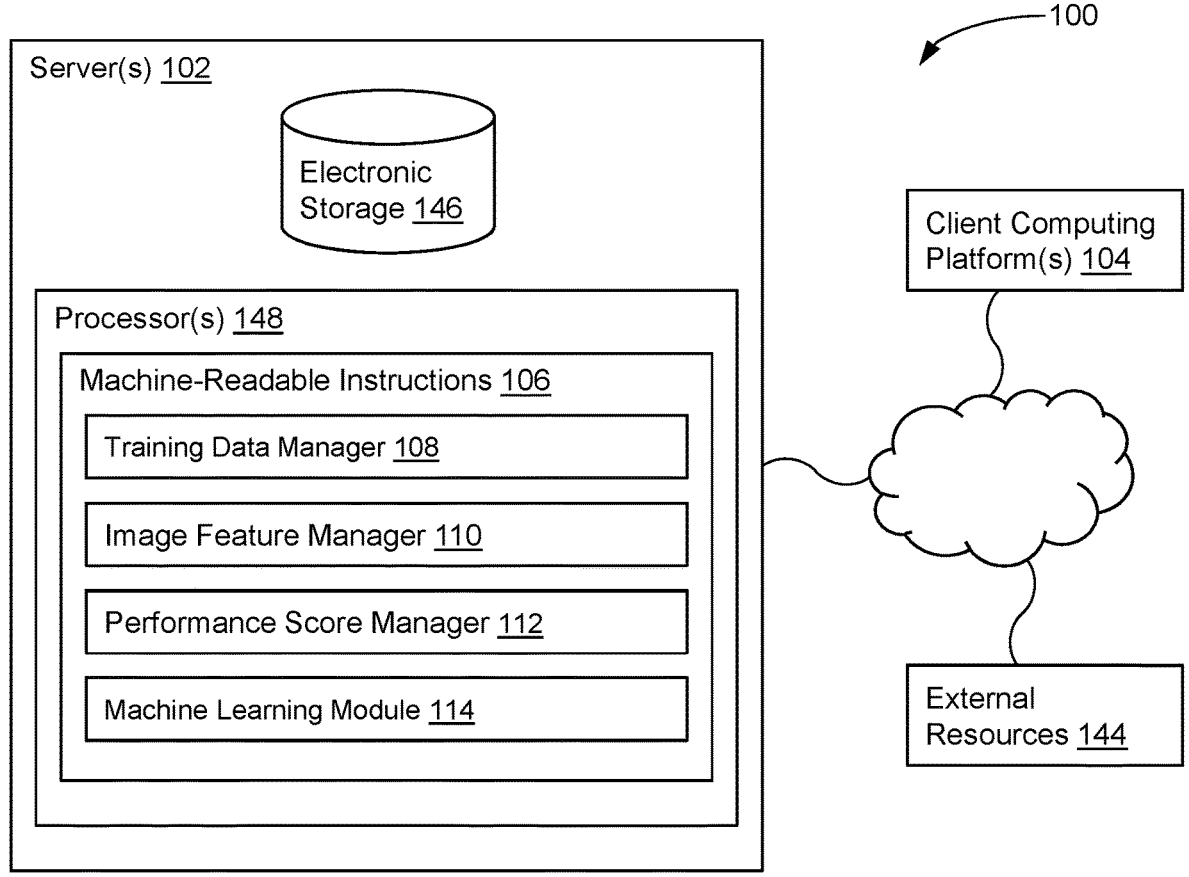
FIG. 1 illustrates a system configured for training a machine learning model, in accordance with one or more implementations.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Image-based content can be among the most important content posted by users to web-based or online platforms, such as social media websites and other websites. Such content can also be referred to as "creative," and can be included as part of an advertising campaign of a business, a post from an individual that contributes to the individual's online image, a graphic design composition using a software application like PhotoShop, or a photograph captured via a user's camera on a mobile device. Often, users (e.g., businesses or individuals) post content items such as images that are intended to appeal to a group of viewers who share a particular set of demographic characteristics. Such a group can be referred to as a target audience or intended audience.

Selecting the best content (e.g., images), and the right attributes of content, can improve the performance of the content among the target audience. For example, performance of content can be or can relate to audience awareness, customer engagement, memorability, preference, conversions, and sales resulting from or related to the content. However, it can be difficult for a user to know in advance how a particular content item is likely to perform among a target audience. Inefficient and inaccurate "guess and check" techniques can be common practice. As a result, a large amount of capital can be wasted on "A/B testing" of content items, because it is difficult to determine in advance which content items will perform best. Thus, advertising and other forms of content generation and/or content publishing today often begin with a content item (e.g., an image or a video) that is published, and then subsequently finds an audience after it has been published, rather than first selecting a target audience and designing content specifically to appeal to the selected target audience. This process can be expensive and error prone.

The systems and methods described in this disclosure can implement a scoring mechanism which can predict how a content item is likely to perform among a predetermined target audience. For example, various computer-implemented techniques, including artificial intelligence and machine learning algorithms, can be used to train a model (e.g., a neural network or other machine learning model) to generate a performance score for an image. The performance score can correspond to a prediction of how the image is likely to perform among a predetermined target audience. In addition, this disclosure provides techniques for gathering existing content items that have been viewed or engaged with by the target audience and using actual performance metrics related to the existing content items to train the model that generates the performance score for a given image. Thus, the model can be trained using real-world information about the types of content that the audience prefers and is not limited to any one platform (i.e. the technology is platform-agnostic).

The model can also be applied to a limitless number of target audiences. Furthermore, the subject matter described in this disclosure can be used to overcome challenges in fields including consumer research, consumer testing, and market testing. For example, a consumer panel or focus group often takes a period of days or weeks, and a significant investment of capital, to evaluate candidate content items. Due to this time and expense, these techniques are often limited to very small samples of people and few examples of candidate content items. The performance scoring model describe in this disclosure can perform these types of analyses in real-time without soliciting feedback from any human users. In that way, the system can be used to effectively simulate the results of a focus group having a specified set of demographic or psychographic characteristics evaluating candidate content items. As a result, a user such as a designer or creative professional who is actively developing a new creative work can quickly and iteratively evaluate new concepts, or concept variations, using the techniques described in this disclosure to get fast results and insights to streamline their work.

The model described in this disclosure can also be applied to multiple audiences, thereby enabling a user to quantitatively determine which image of multiple candidate images is likely to be most effective across more than one target audience (e.g., a first target audience of men ages 18-24 and a second target audience of women ages 34-55), which using traditional research techniques may require two distinct sample populations to be surveyed independently.

The model can also be applied to search indexing. For example, the model can be trained using any set of training data, which may include a set of training data based on image subject matter rather than a particular target audience. In some implementations, the model can be trained to evaluate images having common subject matter, such as images that depict an apple. Continuing with this example, using such a model, instead of searching through hundreds of pages of search results related to the search term "apple" and subjectively selecting one resulting images as the "best" picture of an apple, the model may be used to produce performance scores that are indexed with images that result from a search for the term "apple," which can enable a user to quickly find the best images of an apple for a particular target audience. This can improve time efficiency for content discovery and the image searching process, while also eliminating human operator guesswork about which images are likely to perform best among a target audience. Thus, the systems and methods described below represent a significant improvement in the fields of artificial intelligence and machine learning, as well as the fields of content development, electronic searching, business, marketing, design, consumer research, and testing performance optimization.

The subject matter described in this disclosure can be used to overcome challenges relating to the training of machine learning models with only limited data sets. For example, the performance scoring model may be trained in a manner that results in accurate performance scores even with access only to a relatively small set of training data. This can be achieved, for example, by first extracting stylistic features from a set of training images, rather than relying on the raw image data in the training images themselves to train the model. As a result, the model can be trained in a faster and more computationally efficient manner, relative to conventional techniques for training machine learning models. This can enable the model to run on computer hardware that does not require large amounts of memory.

Training a machine learning model based on raw image data of a set of training images can be difficult because there may not be significant meaning in the pixel-by-pixel variation of an image that relates to its perceived quality among an audience. Stated differently, raw image data may have a low signal-to-noise ratio for purposes of training a machine learning model. Because the training process for a machine learning model can cause the model to "learn" patterns in the training data, training data that contains a high level of noise may cause the model to erroneously determine that patterns resulting from the noise are important. To cause the model to recognize the more important patterns can require a very large training data set. As a result, a massive set of training images may be required in order to train such a model to produce good results in this manner. In some implementations, it may be very difficult or impossible to obtain such a large training data set, and it may be computationally intensive to train the model in this manner due to the size of the training data set. This disclosure addresses the technical challenges that arise from attempting to train a machine learning model based on raw image data by first extracting higher-level features from each training image. For example, such a feature can be any feature that may relate to more than one pixel in an image. These features can be referred to as "stylistic features," and may relate to aspects of an image such as a type of object shown in the image, a dominant color scheme in the image, a brightness or contrast of the image, etc. These features can also include features that relate to the overall presentation of material in an image, such as layout or composition features. Such features may matter more to a human viewer's perception of image quality than lower-level features (e.g., individual pixel features), and can therefore be more useful for training the model than the raw image data. The techniques of this disclosure can train a machine learning model based on these extracted features. As a result, the model can be trained more accurately with a much smaller training data set, which also can reduce computational complexity. In addition, training the model using a combination of different types of high-level features can allow the model to evaluate candidate images based on the interplay of these different feature types relative to one another within the same image.

In some implementations, it can be difficult to identify and extract meaningful features from an image in an automated fashion. To address this technical challenge, in some implementations classification or detection networks can be used to extract features from an image. These types of networks can be used to classify an input image into one of a small number of states. For example, a detection network could be used to determine whether an image includes a dog (e.g., the model classifies images into two states, including one state for images that depict dogs and another state for images than do not depict dogs). Such a network may include nodes arranged in layers including an input layer, several hidden layers that form a "black box," and an output layer that provides an answer to the classification question. For many applications, the outputs of hidden layers of a classification network may not be of interest because they do not answer a classification question, and so they are often ignored. However, as described further below, the outputs of these hidden layers in a classification network that is used to process image data (e.g., an object detection network, a scene detection network, etc.) can provide useful information about features of an image that are important to human perception of image quality and subtle aspects of an image that tend to increase viewer engagement. This disclosure describes techniques for using such information to efficiently train a machine learning model. Such a machine learning model may make use of a wide range of such features in a set of training images, to improve the accuracy of the model's performance in evaluating a new candidate image that has not been previously analyzed by the model.

In some implementations, feature sets can be mathematically represented as tensors. Some feature sets can be much larger than others. In some implementations, larger feature sets can overwhelm smaller feature sets during training of a machine learning model. For example, due to differences in the size of certain features sets, the model may not properly account for the importance of a smaller feature set. To address this technical challenge, this disclosure provides techniques for introducing feature tensors at different layers of a machine learning model. For example, larger feature tensors may be introduced at an input layer of the model, and smaller feature tensors may be introduced at a hidden layer downstream from the input layer. This approach can allow smaller feature tensors to be given more significance than their small size would suggest for purposes of training the model, because they are introduced closer to the output.

As described above, unlike an end-to-end convolutional neural network, the machine learning model described in this disclosure can use image features extracted from a source image. For example, image features can be extracted using one or more other machine learning processes. In some implementations, such features may be reused for purposes of training multiple instances of the machine learning model in a manner that improves overall efficiency of the training process. For example, this can enable an "extract once, use many" framework whereby the extraction process is performed only once, but the extracted features can be reused any number of times to train multiple instances of the machine learning model. In some implementations, the extraction process may represent a majority of processor utilization (e.g., CPU and/or GPU utilization). Other computational work, such as training the model using the extracted features, may require substantially less resources. For example, if 97% of the resource utilization occurs in the extraction stage and only 3% occurs in during training of the model, then each additional pass through an instance of the model may only incur around 3% additional resource utilization, dramatically increasing the efficiency of the system.

Furthermore, traditionally, computer users that input images to a machine learning model to obtain performance scores are often left in the dark as to how the machine learning model generated the scores, and relatedly, how a user can use such information to improve his/her score. For instance, a user may apply an image to a convolutional neural network and obtain a performance score of 70% without any indication of the features of the image that were used to generate the performance score or the impact such features had. To determine how the score was calculated, the user would need to manually input a large number of images and identify patterns as to which features of the images caused the images to have higher or lower performance scores. This process may be difficult given the nature of machine learning models as the models may learn hidden patterns that are not easily apparent to the human eye, even when given a large sample of image performance scores and access to the weights and parameters of the models. Therefore, what is needed is a method for manipulating the machine learning model after the model has generated a performance score for an image to interpret where in the image the model was "looking" when generating the performance score and the impact different portions of the image had on the performance score. Such a method would enable a user to identify features of the image or video that are contributing to positive impressions/positive reactions to the image, as well as enable the user to identify "opportunity areas" of the image which may be features which are not performing as strongly as expected or rather are negatively contributing to the score.

By implementing the systems and methods described herein, after executing a machine learning model to obtain a performance score for an image, a processor may manipulate the data generated by the model to automatically generate a performance score heat map for the image with colors overlaying the image to indicate how the specific portions of the image affected the performance score. If the model is a neural network, the processor may extract values from locations within the neural network and use back-propagation techniques to obtain impact scores for different features of the image indicating how the features impacted the performance score. The processor may evaluate the impact scores and determine whether each feature had a positive or negative impact on the performance score and the magnitude of the impact. The processor may identify the locations of the image that correspond to the different features and generate a heat map overlay that has colors at locations within the overlay that correspond to the impact scores of the features of the image. The processor may place the overlay over the image to generate an evaluation image that enables a user to easily see which portions of the image had the largest or smallest impact on the performance score and whether the impact was positive or negative. A processor may also generate a written description of one or more features which are highlighted in the heat map that are driving the positive or negative impact to improve user understandability. Such a written description of the features may also contain numerical values or scores measuring the influence or impact of such features in the evaluation. Written descriptions from more than one image, for example, may be used to generate a description of a "visual trend" that is influencing the audience's behavior with images. Thus, the processor can generate an evaluation image that illustrates data indicating which objects or characteristics to include in an image and which objects or characteristics to exclude in future images to increase an image's performance score.

Further, because the processor may train multiple machine learning models to simulate different target audiences (e.g., audiences of different ages, genders, hobbies, interests, etc.), the processor may create an easy-to-use interface that allows a user to obtain heat maps for the same image for different target audiences. Because each machine learning model may be trained based on data generated based on interaction and viewing data of members of the corresponding target audience, the models may be trained to look at different aspects of an image from each other to determine performance scores for the same image. By way of example, if an image is of a family taking a camping trip, features in the image representing a campfire may correspond to a high positive impact for a machine learning model trained to simulate males aged 18-30 while the same features may have little or even a negative impact for a machine learning model trained to simulate females of the same age. Thus, the processor may assign different colors or stylistic renderings to the campfire features of the image when generating heat maps for each model's performance score for the image. A user may select different target audiences to view such heat maps to easily determine how an image would perform with different target audiences.

The systems and methods described herein are advantageous over systems that use machine learning models to predict whether an object is in a particular image using a classification process. Such models may only look at features that indicate an object is in an image while disregarding any features of the image that are not relevant to the object. Instead, by implementing the systems and methods provided herein, a processor may evaluate whether different features of an image had a positive or negative impact on the performance score for the entire image, enabling users to have a full view of how the performance score was determined for an image using regression-based methods.

FIG. 1 illustrates a system 100 configured for training a machine learning model, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

The server(s) 102 may be configured by machine-readable instructions 106. Machine-readable instructions 106 may include one or more instruction modules. The instruction modules may include computer program modules. The instruction modules may include one or more of a training data manager 108, an image feature manager 110, a performance score manager 112, a machine learning module 114, and/or other instruction modules.

Together, the training data manager 108, the image feature manager 110, the performance score manager 112, the machine learning module 114, and the other components of the system 100 can be configured to train a machine learning model for assigning a performance score to a candidate image. The performance score can represent a prediction of how well the candidate image will resonate with a predetermined target audience (e.g., a number of interactions (e.g., likes or ratings) the image is likely to receive, a value for a product shown in the image, a length of time a person may look at the image, a predicted number of sales, etc.). Thus, to train the model to provide accurate performance scores, the system 100 may first gather, collect, receive, or otherwise access a set of training data to train the machine learning model. In some implementations, the training data can be based on characteristics of the target audience.

In some implementations, the target audience can be defined by one or more traits or characteristics shared by members of the target audience. For example, the target audience can be defined in terms of any combination of demographics, behavioral tendencies, lifestyle indicators, or other specific market segmentation criteria. In some implementations, the traits of the target audience can be received directly from a user of one or more of the client computing platforms 104. In some implementations, the user can transmit information corresponding to one or more traits of a desired target audience to the server 102. For example, the user can be a business interested in marketing a product to a particular target audience (e.g., sports fans between the ages of 18 and 34).

After the audience is defined, the training data manager 108 can be configured to identify the training data including a set of images that are viewed and/or interacted with members of the target audience. In some implementations, the training data can include images published to websites, such as social media accounts or business websites, that are typically viewed by members of the target audience. For example, such a website can be hosted by one or more of the client computing platforms 104. Such a website can be referred to as a web-based property, and may include any number of web pages, image files, and other electronic content that can be accessed by the server 102. In some examples, the target audience itself can be defined in terms of one or more web-based properties. For example, the target audience can include users who view, or follow, a particular web-based property, or otherwise engage with its published contents.

In order to learn the visual preferences for the target audience, the training data manager 108 can identify or determine the types of images, and attributes of those images, that the audience is visually engaged by. In some implementations, the training data manager 108 can derive this information algorithmically by looking at the target audience's Internet and social media activities and behaviors (e.g., the web-based properties they visit, the retailers they shop at, the influencers they follow on social media, the news and magazines they read, the social media contents they interact with, etc.). In some examples, web-based properties may be commercial in nature, but they do not need to be.

In some implementations, the training data manager 108 can identify at least one input property, which can also be referred to as a seed property, that is preferred by the target audience. For example, the seed property can be or can include a URL of a social media account, a website domain, or URLs of individual media content. The training data manager 108 can be configured to determine a set of other web-based properties that are visited by the same or similar group of users (e.g., the target audience) as the seed web-based property. In some implementations, the training data manager can determine the set of other web-based properties by applying a network analysis algorithm based on the visitors or published contents of the seed web-based property. In an illustrative example, the seed web-based property may include at least one consumer brand's page or content on a social media platform. Two metrics of such an account may be a number of followers of the account and a number of 'engagers' of the account. For example, an "engager" may be a user who has commented on or "liked" the contents published by that account. Thus, if a post from the web-based seed property was "liked" 25 times, the training data manager 108 can infer that there were 25 engagers of that content. In some implementations, the training data manager 108 can extract a sample list of followers or engagers of such an account, for example based on the followers' or engagers' usernames. The training data manager 108 may also identify accounts that are commonly followed by followers of the seed web-based property. In some implementations, this can be achieved using simple attribute matching-based approaches. In some implementations, this can be achieved using a webgraph, or a collection of websites, and the training manager 108 can identify websites that are commonly visited by a similar demographic, psychographic, or other behavior-based cohort of users. In some implementations, this can be achieved by identifying web-based properties that publish visually similar contents on a visual graph. It should be understood that these techniques are exemplary only and should be not interpreted as limiting the scope of this disclosure.

In some implementations, the training data manager can rank determined set of web-based properties based on a proportion (e.g., a "density") of the composition of the visitors of those web-based properties who are also members of the target audience and who interact with those properties. Visitors may include users who view the web-based properties, "followers" of the web-based properties, "content engagers" of the web-based properties, or any other users who interact with images published by the web-based properties, for example.

From this information, the training data manager 108 can identify a subset of the web-based properties that are most uniquely visited by the target audience. For example, based on a determination that the visitors who interact with a seed web-based property tend to share a set of characteristics (e.g., an audience that includes female yoga enthusiasts under 35 years old), the training data manager 108 can identify other properties that are also frequently visited by a high proportion of that same audience or a similar audience having overlapping characteristics. This process can allow the training data manager 108 to identify the subset of web-based properties preferred by the target audience.

In some implementations, the training data manager 108 can use this subset of web-based properties as the basis for harvesting one or more sets of images. These harvested images can be referred to as training images. For example, the training data manager 108 can examine social media accounts, business websites, and other online resources associated with the identified subset of web-based properties to locate the training images for the target audience.

In some implementations, the training data manager 108 can apply analytical techniques to determine which of the identified subset of web-based properties have posted images on social media, or on another medium, and that have some type of interaction data associated with them. For example, the training data manager 108 may examine the volume and frequency of postings and the proportion of engagement earned on postings relative to total viewership of those postings made by the web-based property. The training data manager can then, based on a series of internal rules & algorithms, evaluate the usability of the information that can be derived from the web-based property, its suitability for different purposes within the system, and the importance of any data related to the property to the training process. The training data manager 108 may also examine the relevance of the image contents from a particular web-based property to a target audience relative to other images harvested on the audience outside of one individual web-based property. For example, the interaction data can include a number of "likes," a number of comments, etc. Such interaction data for a given image can also be referred to as an "engagement metric" for the image. In some implementations, the training data manager 108 can generate or determine an engagement metric for an image based on the interaction data for the image. An engagement metric for an image can be useful, because it can indicate whether the target audience prefers the image relative to other images they have viewed or interacted with. Thus, if an image doesn't have any associated interaction data, then the training data manager 108 can remove that image from the set of training images.

In some implementations, the training data manager 108 can be configured to determine which of the identified subset of web-based properties are "visually influential" among the target audience. For example, the training data module can be configured to establish minimum thresholds for characteristics of a web-based property such as its size and popularity, quality of images posted to the web-based property, relevance of image content to the target audience, number of images posted to the web-based property, engagement thresholds with posted images (e.g., thresholds for any type or form of interaction data), user sentiment in the comments or other reactions to the images posted to the web-based property, etc.

In some examples, the training data manager 108 can determine visually influential properties based on one or more property categories that tend to be visually rich. For example, web-based properties that are categorized as apparel or lifestyle can be identified as more visually influential, relative to other categories of web-based properties. In some implementations, the training data manager 108 can filter out or otherwise exclude images from web-based properties that are categorized as less visually influential. In some examples, less visually influential categories may include government and banking.

In some implementations, the training data manager 108 can normalize the engagement metrics for images based on a variety of factors. For example, the training data manager can apply a weight to the engagement metrics of images in the dataset based on engagement rates of each of the images. In one example, the training data manager 108 can divide an engagement metric for an image by a number of followers of its respective web-based property to determine a normalized engagement metric for the image. In another example, the training data manager 108 can normalize the engagement metric based on a number of views or impressions for each image. For example, if 100 users viewed images A and B, 50 users clicked on image A, and 75 users clicked on image B, then the training data manager 108 can normalize the engagement metrics to indicate that image B is more visually engaging that image A.

In some implementations, the training data manager 108 may be configured to normalize the engagement metric for a training image based on a size of its audience (e.g., a number of visitors to the web-based property on which the training image was published). For example, this can help to avoid ranking an image as high performing or low performing based primarily on the overall popularity of a web-based property on which the image is posted, rather than on the quality of the image itself. Thus, a lower quality image posted on a very popular website may not have a higher normalized engagement metric than a high-quality image posted on a less popular website. Stated differently, the training data manager 108 can determine normalized engagement metrics for training images in a manner that prevents the size of an audience for the image (or for the web-based property that published the image) from overwhelming other information about the image. Audience size can be a factor of in determining a normalized engagement metric for an image, however normalized engagement metrics may not scale linearly with audience size. For example, a first training image and a second training image may each have a similar engagement metric. If the first image has an audience that is ten times as large as the audience for the second image, the training data manager 108 can determine that the normalized engagement metric for the first image should be larger than the normalized engagement metric for the second training image. However, in some implementations the training data manager 108 may determine a normalized engagement metric for the first training image that is less than ten times as large as the normalized engagement metric for the second training image. In some implementations, the training data manager 108 may be configured to normalize the engagement metric for each training image based on engagement of the audience with the plurality of images included in the respective web-based properties over time. For example, this can help to account for variations over time in audience size of a web-based property from which training images are gathered.

In some implementations, if a web-based property has too few followers, too few images, poor images, highly variable contents and themes, or poor engagement signals, the training data manager 108 can remove images from that web-based property from the training data. For example, even if the web-based property is popular among the target audience, the images published to that web-based property may not be visually engaging to the target audience and therefore may not provide value for the training data.

In some implementations, the training data manager 108 can use one or more sample images, rather than an entire web-based property, as the seed for the process of selecting training data. In this approach, the training data manager 108 can identify or receive an image of a subject matter that is relevant and preferred by a target audience and is therefore likely to be visually descriptive of the audience. Then, the training data manager 108 can identify a set of web-based properties based on the seed image and can use these web-based properties as the basis for dataset generation as described above. In some implementations, the training data manager 108 can match an input image to a set of saved images (e.g., stored in the electronic storage 146. The training data manager 108 can then determine one or more best-fit web-based properties related to the saved images and can use those web-based properties as the basis for gathering the training dataset.

In some implementations, the training data manager 108 can use a seed web-based property to find similar web-based properties based on visual material published from each web-based property. For example, if a target audience includes a men's fashion audience, the training data manager 108 can identify one example of a men's fashion web-based property to use as the seed, and can also identify similar web-based properties that also post images of men's fashion-related visual material to gather the training dataset. In some implementations, the training data manager 108 can receive a set of web-based properties representing the target audience directly from a user of one of the client-computing platforms 104. For example, the user may be a business who has performed their own market research to identify relevant web-based properties.

Conventional techniques for defining an audience and or selecting training data can include convening a focus group or survey of a number of members of a desired audience, showing them a large number of images, and asking them to rank those images by preference. This technique can similarly produce a labeled dataset of visual material preferred by the audience. However, using the techniques described above, the training data manager 108 can determine the target audience and gather training images in a manner that does not require this very time consuming, expensive, error-prone, and potentially biased manual process. As a result, training data gathered using the techniques disclosed herein can be more accurate and less biased, and the approaches can more easily be scaled to a large number of audiences. In some implementations, the images from all of the web-based properties identified by the training data manager 108 can become the training dataset.

In some implementations, the training data manager 108 may instead select a set of training images without a defined target audience. For example, the set of training images can be chosen based on the subject matter of the images themselves, rather than based on characteristics of users who visit the web-based properties from which the training images are harvested. Thus, the training data manager 108 can be configured to identify training images that relate to certain subject matter (e.g., based on metadata that may be associated with each training image, such as a text-based caption or description for each image). It should be understood that the techniques described below for training a machine learning model can be applied to any set of training images, regardless of whether the training images are collected based on a defined target audience.

In some implementations, the raw image data from the training dataset can be input into a machine learning model to train the machine learning model. For example, the machine learning model can be a neural network or other machine learning model implemented by the machine learning module 114. However, attempting to train such a model by using the raw image data can be computationally inefficient, and may require that the training dataset be very large in order to effectively train the model. To overcome this technical challenge, lower-level features of the images, rather than the images themselves, can be used to train the model.

Figure 2:
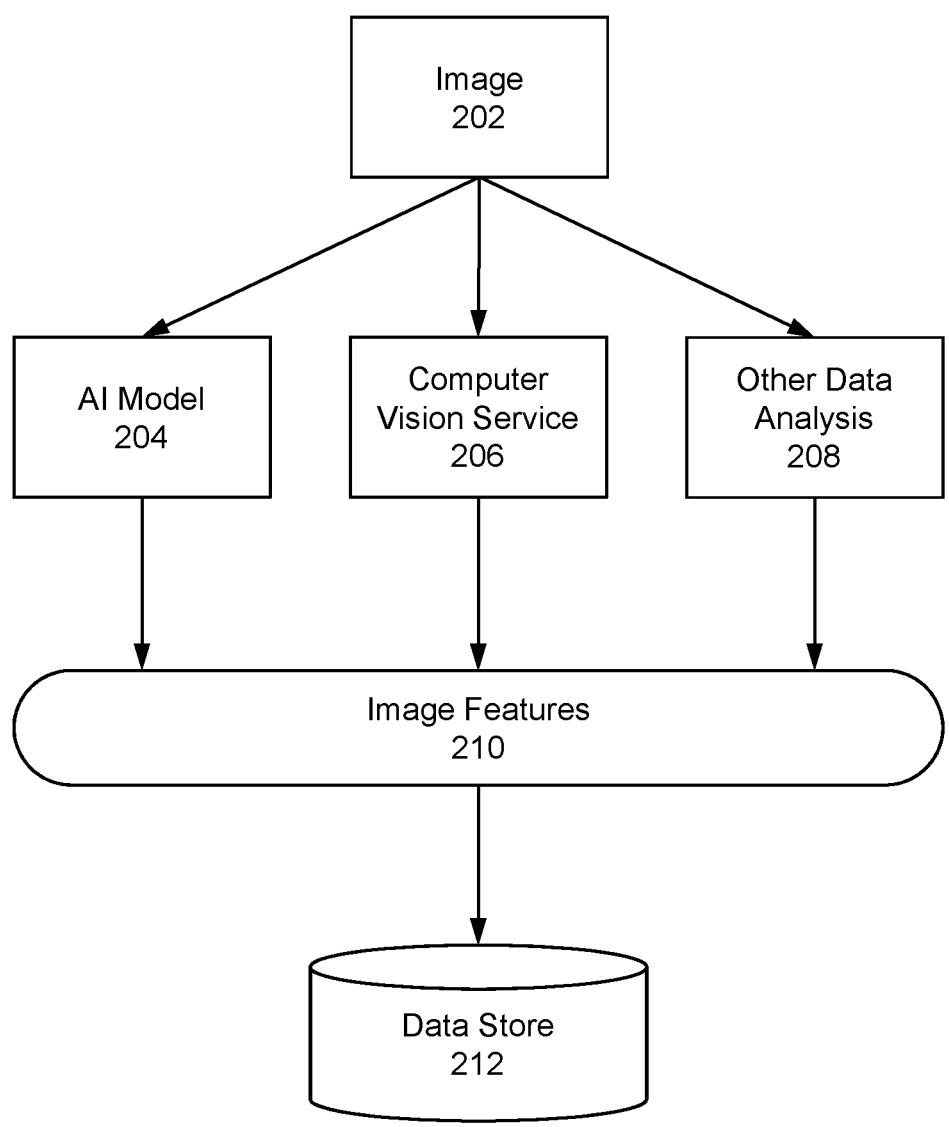
FIG. 2 illustrates data flow in a process for extracting features from images, in accordance with one or more implementations.

FIGS. 2-5 depict processes for extracting features from images, training a machine learning model, and using the trained model to generate a performance score for a candidate image. The processes depicted in FIGS. 2-5 can be implemented, for example, by the server 102 of FIG. 1. Thus, FIGS. 2-5 are described below with reference also to FIG. 1. Referring now to FIG. 2, the data flow in a process 200 for extracting features from images is illustrated, in accordance with one or more implementations. The process 200 can be performed, for example, by the image feature manager 110 of FIG. 1. It should be understood that, while FIG. 2 shows feature extraction for a single image 202, the process 200 can be repeated for any or all images in the training dataset. The process 200 can include using one or more artificial intelligence models 204, one or more computer vision services 206, and other data analysis techniques 208 to extract features from the image 202.

In some implementations, the image feature manager 110 can implement the one or more artificial intelligence models 204, the one or more computer vision services 206, and the other data analysis techniques 208. For example, the one or more artificial intelligence models 204, the one or more computer vision services 206, and the other data analysis techniques 208 can each include an artificial neural network that includes nodes arranged in a plurality of layers. Each node can be a computational unit, which may also be referred to as an artificial neuron. The layers can be arranged sequentially such that a node receives an input signal from one or more of the nodes in the previous layer, processes the input according to a function to produce an output, and transmits the output to one or more nodes of the next layer. The first layer of such a network can be referred to as an input layer, and can receive the raw image data (e.g., data corresponding to each individual pixel of the image 202). The final layer can be referred to as an output layer. Thus, the image data for the image 202 can be propagated through the layers of an artificial neural network to cause the artificial neural network to produce one or more outputs at each layer of the artificial network, including the final or output layer.

In some implementations, any of the one or more artificial intelligence models 204, the one or more computer vision services 206, and the other data analysis techniques 208 can be a detection network. For example, a detection network can be configured to determine a presence or absence of one or more predetermined characteristics of the image 202, such as the features of a scene depicted in the image 202, the features of objects depicted in the image 202, a color or colors most prevalent in the image 202, etc. Each such network can be used to extract a respective set of image features 210 from the image 202. Thus, a scene detection network can be used to extract a set of scene features from the image 202, an object detection network can be used to extract a set of object features from the image 202, etc.

In some implementations, the image feature manager 110 can use the outputs of an intermediate layer of an artificial neural network corresponding to any of the one or more artificial intelligence models 204, the one or more computer vision services 206, and the other data analysis techniques 208. An intermediate layer can be any layer between the input layer and the output layer. Thus, while a detection network may have an output layer that outputs a binary signal (e.g., indicating presence or absence of a particular trait in the image 202), the outputs of intermediate layers also can be relevant to image features 210 in the image 202. In some implementations, these intermediate outputs can be mathematically descriptive of the image 202 itself. In some implementations, the image feature manager 110 can extract the image features 210 based on the outputs of an intermediate layer of an artificial neural network (e.g., any of the one or more artificial intelligence models 204, the one or more computer vision services 206, and the other data analysis techniques 208), which may be represented as a vector, a tensor, or any other form of information.

The image features 210 that can be extracted from the image 202 by the image feature manager 110 are not limited to object, scene, or color features. For example, the features extracted from the image 202 can be or can include any stylistic features that may relate to any visual characteristic of an image, such as layout, position, symmetry, balance, arrangement, composition, pixel intensity, contrast, blurriness, object location, depth of field, angle of view, focal point, view point, vantage point, foreground/background content, white space/negative space, cropping, framing, color scheme, hue, tint, temperature, tone, saturation, brightness, shade, mood, line, angles, noise, contours, gradients, texture, repetition, patterns, blowout, blooming, concentricity, cubic attributes, geometric attributes, shadow, blocked shadow, vignetting, scale, number of objects, position of objects, spatial context, proportion, shapes, shape of objects, number of shapes, attributes of objects, form, perspective, representation, path, scenery, time of day, exposure, time lapse, typography, position of headline, size of headline, length of text, location of call-to-action, typeface, font, location of faces, posture/pose of people, location of figures, gestures, action/activities of people, number of people, hair color of people, ethnicity of people, gender of people, age of people, expressions and emotions of people, facial attributes, clothing and appearance, accessories, resolution, orientation, icons, emojis, logos, watermarks, etc. It should be understood that this list of attributes is exemplary only and should be not read as limiting the scope of this disclosure.

Other types of features of the images in the training dataset also can be extracted from the image 202. It should be understood that while the image features 210 are depicted as a single entity in FIG. 2 for illustrative purposes, in some implementations separate sets of image features 210 may be extracted by each of the one or more artificial intelligence models 204, the one or more computer vision services 206, and the other data analysis techniques 208. The image feature manager 110 can process these separate sets of features, for example by altering a format of the feature sets or combining the feature sets, to produce the image features 210. The image feature manager 110 can store the image features 210 in a data store 212. In some implementations, the data store 212 can correspond to electronic storage 146 of FIG. 2.

Figure 3:
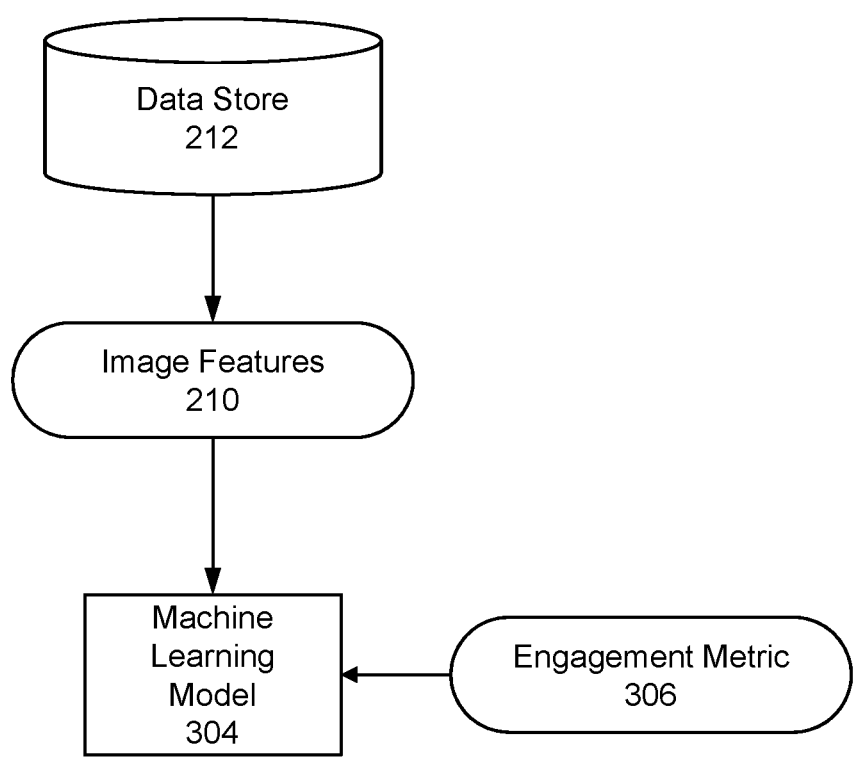
FIGS. 3 and 4 illustrate data flow in a process for training a machine learning model, in accordance with one or more implementations.
Figure 4:
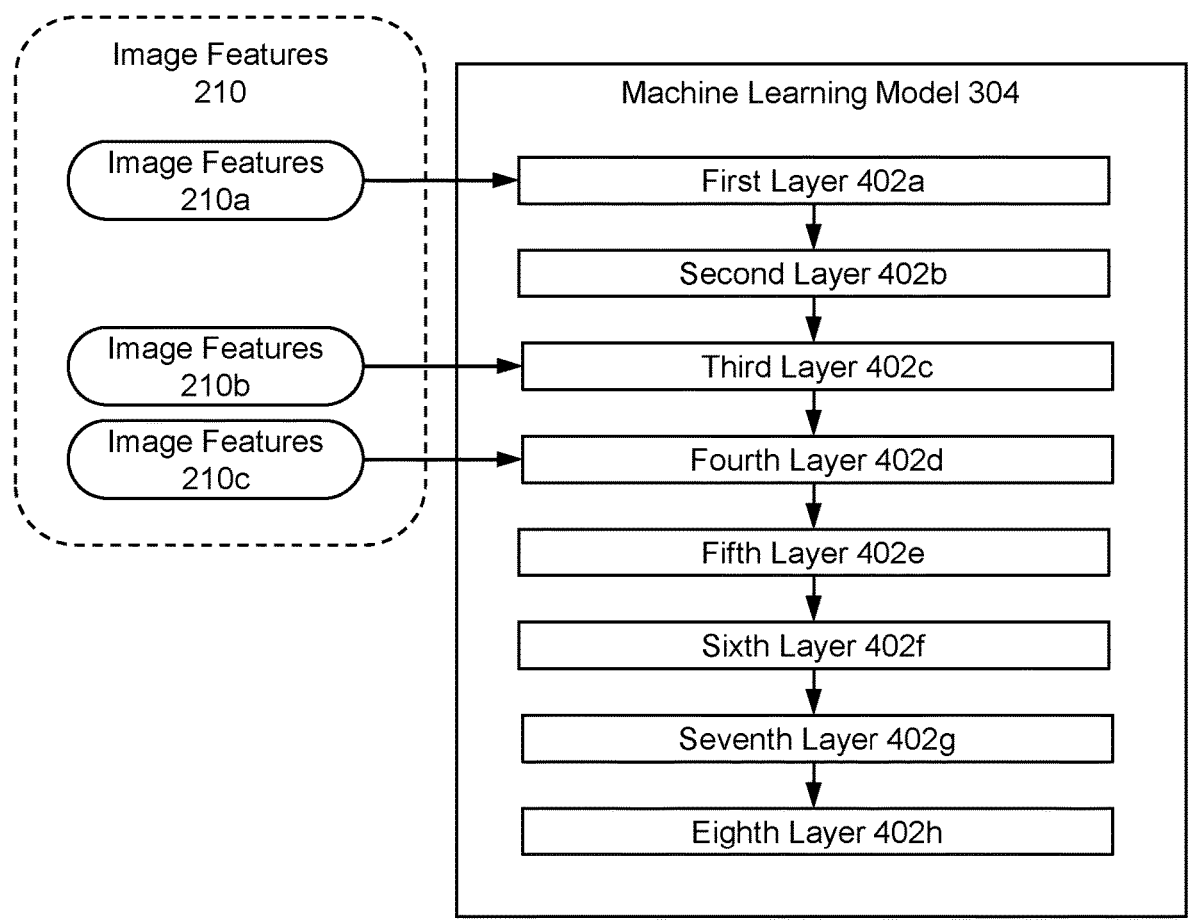

FIGS. 3 and 4 illustrate data flow in processes for training a machine learning model, in accordance with one or more implementations. The process 300 of FIG. 3 and the process 400 of FIG. 4 can make use of the image features 210 extracted in the process 200 of FIG. 2. For example, as shown in FIG. 3, the image features 210 can be retrieved from the data store 212 and introduced into a machine learning model 304. In some examples, the machine learning model 304 can be an artificial neural network, similar in structure to those described above. For example, the machine learning model 304 can include a plurality of nodes or artificial neurons arranged in sequential layers. FIG. 4 shows the layered structure of the machine learning model 304, which includes layers 402a-402h. The first layer 402a can serve as an input layer, the eighth layer 402h can serve as an output layer, and the remaining layers 402b-402g can be intermediate layers. In some examples, the intermediate layers 402b-402g can be referred to as hidden layers, because their outputs are typically abstracted from outside of the machine learning model 304.

In one example technique for training the machine learning model 304, an "end-to-end" approach can be used. For example, in an end-to-end approach, all of the image features 210 can be introduced at the input layer 402a of the machine learning model 304 and can be propagated through each layer 402 of the machine learning model 304. Stated differently, all of the image features 210 can be introduced at the input layer 402a, causing all of the nodes in that layer to produce output signals that are transmitted to the second layer 402b. This process is repeated as successive layers 402 of the machine learning model 304. Thus, all the image features 210 for a given image are propagated through the layers 402 of the machine learning model 304 as part of the training process for the machine learning model 304. In some implementations, some of all of image features 210 can be propagated from earlier layers 402 (e.g., layers closer to the input layer 402a) to later layers (e.g., layers 402 closer to the output layer 402h). This may be referred to as forward propagation. In some other implementations, some or all of the image features 210 can be propagated from later layers 402 to earlier layers 402 (e.g., back propagation). The machine learning model 402a can be trained based on the image features 210 for each image, along with a corresponding engagement metric 306 for the image, in order to train the machine learning model 304 to learn to produce predicted engagement metrics for images based on features extracted from those images (e.g., a difference between predicted engagement metrics and the engagement metric 306 may be back-propagated through the machine learning model 304 according to a loss function). A predicted engagement metric can also be referred to as a performance score for the image. In another example of an end-to-end approach, the raw image data itself (rather than the extracted image features 210) for the training data set can be introduced at the input layer 402a of the machine learning model 304.

In some implementations, using an end-to-end approach can be simple. However, the machine learning model 304 may produce inaccurate results if trained in this manner. For example, because of the wide variety of features included in visual content and diverse tastes across different target audiences, the search space (i.e., the diverse number of image attributes and characteristics) for this training task can be very large. As a result, accurately training the machine learning model 304 in this manner can require a massive set of training images. Training images can be difficult to gather for a given target audience, as described above, and therefore a sufficiently large set of training images may not be available. In addition, an end-to-end approach would require a very large architecture (e.g., a large number of nodes in each layer 402, each of which processes the entire volume of image data in the set of training images) and may yield unsatisfactory results.

To address these challenges, the process 400 of FIG. 4 shows an alternative to the end-to-end approach that is more computationally efficient and can result in an accurately trained machine learning model 304 with a smaller training dataset. As shown, the image features 210 can be divided into subsets of image features 210a, 210b, and 210c. Generally, the subsets of image features 210a, 210b, and 210c can be non-overlapping with one another. In some implementations, the subsets of image features 210a, 210b, and 210c can be grouped according to categories or types of features, such as object features, scene features, color features, etc. The subsets of features 210a, 210b, and 210c can be introduced into the machine learning model 304 at different layers selected to optimize or improve the training of the machine learning model 304 relative to an end-to-end approach.

Introducing the extracted image features 210 into the machine learning model 304 in this way can help to guide the machine learning model 304 to evaluate images in predefined directions. For example, the machine learning model 304 can be provided with information regarding the factors that contribute to a human's judgment of images, thereby training the machine learning model 304 to evaluate images in a manner similar to that of the humans who make up the target audience. As a result, the search space can be reduced to a more manageable complexity, and training can be accomplished with a smaller set of training data.

In some implementations, larger subsets of image features 210 can be introduced at earlier layers of the machine learning model 304 (i.e., layers closer to the input layer), while smaller subsets of image features 210 can be introduced at later layers of the machine learning model 304 (i.e., layers closer to the output layer). This approach can help to ensure that the smaller subsets of features are considered by the machine learning model 304 and are not overwhelmed by larger subsets of features. In an example, the subset of image features 210a can be or can include object features (e.g., features that relate to types of objects included in an image). In some implementations, the subset of image features 210a can optionally also include scene features. For example, a vector or tensor representing the object features can be combined with a vector or tensor representing scene features, such as by concatenating the two vectors or tensors. The combined vectors or tensors can be the subset of image features 210a. Object features and scene features can be relatively important factors in evaluating an image, and the associated datasets can be relatively large. For these reasons, the subset of image features 210a can be introduced into the first layer 402a of the machine learning model 304.

Continuing with this example, the subset of image features 210b can include color features. In some implementations, color features may be less important to an evaluation of an image than object features or scene features and can therefore be introduced into the machine learning model 304 downstream from the input layer 402a. In the example of FIG. 4, the subset of image features 210b can be introduced at the third layer 402c. The subset of image features 210c can include all other features extracted from the image (e.g., any image feature not categorized as an object feature, a scene feature, or a color feature) and can be introduced downstreamn from the point of introduction for the subset of features 210b, for example in the fourth layer 402d. This arrangement can be more efficient than the alternatives (e.g., an end-to-end arrangement), as it reduces the computational cost and the data requirement for the training. Higher efficiency is the result of providing the machine learning model 304 with extra information regarding the features that form human's perception of the performance of an image.

The problem of predicting a performance score representing the likely performance of an image can be a regression problem. However, due to the high complexity of such a regression problem, it may be difficult to achieve accurate results using only a regression layer at the output of the machine learning model 304 (e.g., the eighth layer 402h). To address this technical challenge, in some implementations, the accuracy of this regression problem can be improved by defining two loss functions that are trained according to the training dataset. A first loss function can be used one to guide the machine learning model 304 to learn the rough prediction of scores. For example, a rough or coarse prediction can be determined using a classification layer as one of the plurality of layers 402 of the machine learning model 304. The classification layer can be trained to determine probabilities for each of a plurality of ranges of performance scores for an image. For example, a performance score can be an integer value from 1 to 100, with higher values indicating better predicted performance. The classification layer of the machine learning model 304 can be trained to determine probabilities for discrete subranges within the entire possible range, such as a first probability that the performance score is between 1 and 10, a second probability that the performance score is between 11 and 20, a third probability that the performance score is between 21 and 30, etc. This example is illustrative only and should not be viewed as limiting. In other examples, the classification layer of the machine learning model 304 can be trained to determine probabilities for other subranges. For example, the classification layer of the machine learning model 304 can be trained to determine probabilities for two subranges, such as a first probability that the performance score is "low" (e.g., between 1 and 50) and a second probability that the performance score is "high" (e.g., between 51 and 100).

A second loss function can also be defined to learn a more accurate final score, based on the rough or coarse range determined by the classification layer. In some implementations, the second loss function can be implemented by a regression layer downstream from the classification layer. Thus, the overall loss function for the machine learning model 304 can be a combination of the classification loss and the regression loss. The classification loss function can help to guide the model through the coarse range of scores, while the regression loss function is responsible for identifying one particular performance score (e.g., a single integer value) based on the probabilities identified by the classification layer. In such an example, the final layer (i.e., the eighth layer 402h as shown in FIG. 4) can be the regression layer, and the layer immediately upstream from the final layer (e.g., the seventh layer 402g as shown in FIG. 4) can be the classification layer. In some other implementations, the machine learning model 304 can have only a classification layer without a regression layer, or only a regression layer without a classification layer, or only output a feature embedding.

It should be appreciated that the particular arrangement described here and depicted in FIG. 4 is illustrative only and represents only one example. In other implementations, the machine learning model 304 may have a different structure without departing from the scope of this disclosure. For example, the machine learning model 304 may have more or fewer layers than are depicted in FIG. 4. In addition, the image features 210 may be divided into more or fewer subsets than are depicted in FIG. 4, and each subset can be introduced at a different layer than depicted in FIG. 4, without departing from the scope of this disclosure.

FIGS. 3 and 4 show the general approach for propagating image features 210 for a single image 202 through the layers of the machine learning model 304 in order to train the model. It should be appreciated that these processes may be repeated with image features 210 from the other images 202 in the training dataset, along with their corresponding normalized engagement metrics, to train the machine learning model 304. In some examples, all of the image features 210 for all of the images in the training dataset also can be used to train additional variants of the machine learning model 304 in a similar manner. For example, additional variants of the machine learning model 304 can be structurally similar to what is depicted in FIG. 4 but may be configured to apply different weights to different subsets of the image features 210 for training purposes.

Figure 5:
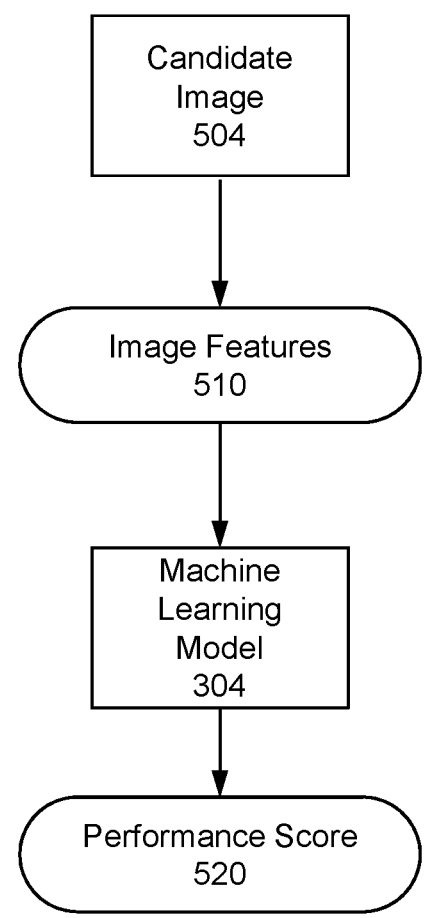
FIG. 5 illustrates data flow in a process for generating a performance score for an image, in accordance with one or more implementations.

FIG. 5 illustrates data flow in a process 500 for generating a performance score for a candidate image 504, in accordance with one or more implementations. In some implementations, the process 500 can be performed by the performance score manager 112 of FIG. 1. The process 500 can make use of the machine learning model 304 that has been trained according to the processes 300 and 400 shown in FIGS. 3 and 4, respectively. The candidate image can be any image whose likely performance among a target audience is of interest. For example, a user of one of the client computing devices 104 may submit the candidate image 504 for scoring prior to publishing the candidate image 504. In some implementations, a user may submit more than one candidate image 504 and each candidate image 504 can be scored separately, so that the predicted performance of each candidate image 504 can be compared to the others.

In some implementations, data flow for scoring the candidate image 504 can be similar to data flow for training the machine learning model 304 with each image of the training data. For example, rather than processing the raw image data (e.g., pixel data) for the candidate image 504 using the machine learning model 304, a set of image features 510 can first be extracted from the candidate image 504. In some implementations, the image features 510 can be extracted from the candidate image 504 using the same or similar techniques described above for extracting the image features 210 from an image 204. For example, as show in FIG. 2, one or more AI models 204, one or more computer vision services 206, and other data analysis techniques 208 can be used to extract features from the candidate image 504. In some implementations, the one or more AI models 204, the one or more computer vision services 206, and the other data analysis techniques 208 may be or may include artificial neural networks having layered structures, and features may be extracted from intermediate layers of these artificial neural networks.

In some implementations, the performance score manager 112 can propagate the image features 510 of the candidate image 504 through the trained machine learning model 304. For example, the image features 510 of the candidate image 504 can be introduced and propagated through the layers of the machine learning model 304 in the same manner or a similar manner used for training of the machine learning model 304. Thus, the image features 510 can be divided into subsets of image features, and each subset can be introduced at a different layer of the machine learning model 304. For example, the image features 510 can be grouped into smaller subsets according to categories or types of features, such as object features, scene features, color features, etc. The subsets of the image features 510 can be introduced into the machine learning model 304 at different layers selected to optimize or improve the training of the machine learning model 304 relative to an end-to-end approach.

The trained machine learning model 304 can process the image features 510 of the candidate image 504 to generate a performance score 520 for the candidate image. In some implementations, the performance score 520 can be selected from among a plurality of possible performance scores (e.g., an integer value within a predetermined range, a decimal value between 0 and 1, etc.). The performance score 520 can be determined by the machine learning model 304 based on both a classification analysis and a regression analysis, as described above. In some implementations, the process 500 can also be repeated using one or more variants of the machine learning model 304, each of which may calculate a respective performance score 520. In some implementations, the performance score manager 112 can be configured to select an overall performance score based on any number of performance scores 520 calculated by different variants of the machine learning model 304. For example, the performance score manager 112 can be configured to select the overall performance score as an average of the performance scores 520 calculated by a plurality of variants of the machine learning model 304.

In some implementations, server(s) 102, client computing platform(s) 104, and/or external resources 144 may be operatively linked via one or more electronic communication links. For example, such electronic communication links may be established, at least in part, via a network such as the Internet and/or other networks. Thus, the client computing platform(s) 104 may transmit data (e.g., image data) to the server(s) 102 by way of the Internet or other networks. In some implementations, the client computing platform(s) 104 may execute a web browser application that can interface with the server(s) 102 via one or more websites hosted by the server(s) 102. For example, the server(s) 102 may provide an application programming interface (API) that can be accessed by the client computing platform(s) 104 by way of such a website. In some implementations, the client computing platform(s) 104 may instead access such an API by other means (e.g., via a dedicated application that executes on the client computing platform(s) 104, rather than through a website). In some implementations, functionality described as being performed by the server(s) 102 may instead be performed directly by the client computing platform(s) or by the external resources 144). It will be appreciated that this is not intended to be limiting, and that the scope of this disclosure includes implementations in which server(s) 102, client computing platform(s) 104, and/or external resources 144 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 144, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a server, and/or other computing platforms.

External resources 144 may include sources of information outside of system 100, external entities participating with system 100, and/or other resources. In some implementations, some or all of the functionality attributed herein to external resources 144 may be provided by resources included in system 100.

Server(s) 102 may include electronic storage 146, one or more processors 148, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 146 may comprise non-transitory storage media that electronically stores information. The electronic storage media of electronic storage 146 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 146 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 146 may include one or more virtual storage resources (e.g., cloud storage, a virtual private network, and/or other virtual storage resources). Electronic storage 146 may store software algorithms, information determined by processor(s) 148, information received from server(s) 102, information received from client computing platform(s) 104, and/or other information that enables server(s) 102 to function as described herein.

Processor(s) 148 may be configured to provide information processing capabilities in server(s) 102. As such, processor(s) 148 may include one or more of a digital processor, an analog processor, a digital circuit designed to process information, an analog circuit designed to process information, a state machine, and/or other mechanisms for electronically processing information. Although processor(s) 148 is shown in FIG. 1 as a single entity, this is for illustrative purposes only. In some implementations, processor(s) 148 may include a plurality of processing units. These processing units may be physically located within the same device, or processor(s) 148 may represent processing functionality of a plurality of devices operating in coordination. Processor(s) 148 may be configured to execute modules 108, 110, 112, and/or 114, and/or other modules. Processor(s) 148 may be configured to execute modules 108, 110, 112, and/or 114, and/or other modules by software; hardware; firmware; some combination of software, hardware, and/or firmware; and/or other mechanisms for configuring processing capabilities on processor(s) 148. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and/or 114 are illustrated in FIG. 1 as being implemented within a single processing unit, in implementations in which processor(s) 148 includes multiple processing units, one or more of modules 108, 110, 112, and/or 114 may be implemented remotely from the other modules. The description of the functionality provided by the different modules 108, 110, 112, and/or 114 described below is for illustrative purposes, and is not intended to be limiting, as any of modules 108, 110, 112, and/or 114 may provide more or less functionality than is described. For example, one or more of modules 108, 110, 112, and/or 114 may be eliminated, and some or all of its functionality may be provided by other ones of modules 108, 110, 112, and/or 114. As another example, processor(s) 148 may be configured to execute one or more additional modules that may perform some or all of the functionality attributed below to one of modules 108, 110, 112, and/or 114.

Figure 6:
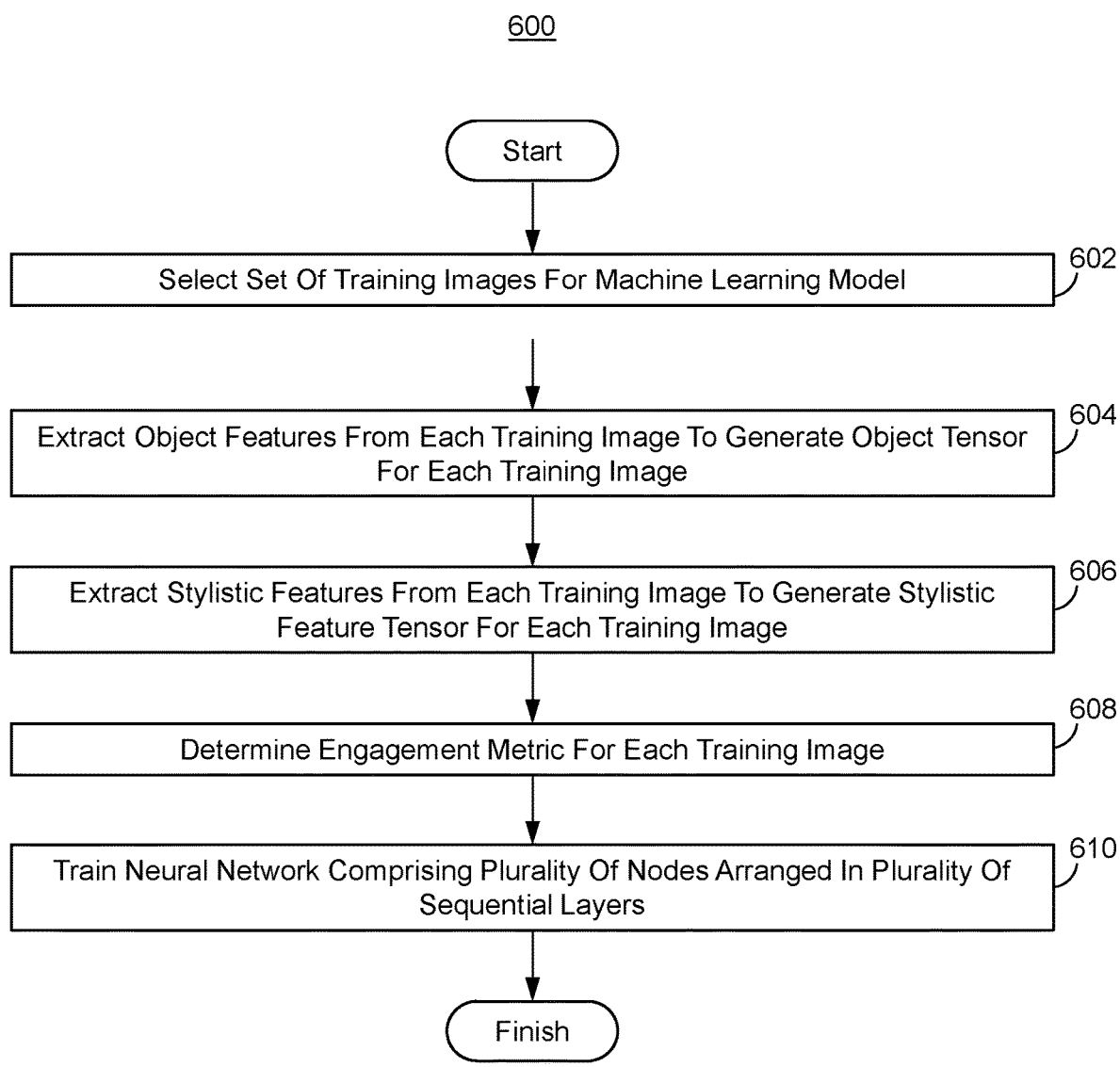
FIG. 6 illustrates a method for training a machine learning model, in accordance with one or more implementations.

FIG. 6 illustrates a method 600 for training a machine learning model, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information), such as the server 102 of FIG. 1. The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include selecting a set of training images for a machine learning model. Operation 602 may be performed by one or more hardware processors configured by machine-readable instructions including a module that is the same as or similar to the training data manager 108, in accordance with one or more implementations. In some implementations, a target audience can be identified. In some implementations, the set of training images can be selected based at least in part on such a target audience.

An operation 604 may include extracting object features from each training image to generate an object tensor for each training image. Operation 604 may be performed by one or more hardware processors configured by machine-readable instructions including a module that is the same as or similar to the image feature manager 110, in accordance with one or more implementations.

An operation 606 may include extracting stylistic features from each training image to generate a stylistic feature tensor for each training image. Operation 606 may be performed by one or more hardware processors configured by machine-readable instructions including a module that is the same as or similar to the image feature manager 110, in accordance with one or more implementations.

An operation 608 may include determining an engagement metric for each training image. The engagement metric corresponding to a performance score. Operation 608 may be performed by one or more hardware processors configured by machine-readable instructions including a module that is the same as or similar to the training data manager 108, in accordance with one or more implementations.

An operation 610 may include training a neural network including a plurality of nodes arranged in a plurality of sequential layers. Training the neural network may include propagating information included in the object tensor for each training image through each layer of the neural network including an input layer and propagating information included in the style tensor for each training image through a subset of the layers of the neural network not including the input layer. The layers of the neural network may include at least a classification layer to determine probabilities for each of a plurality of ranges of performance scores for a candidate image. Operation 610 may be performed by one or more hardware processors configured by machine-readable instructions including a module that is the same as or similar to the training data manager 108, in accordance with one or more implementations.

Figure 7:
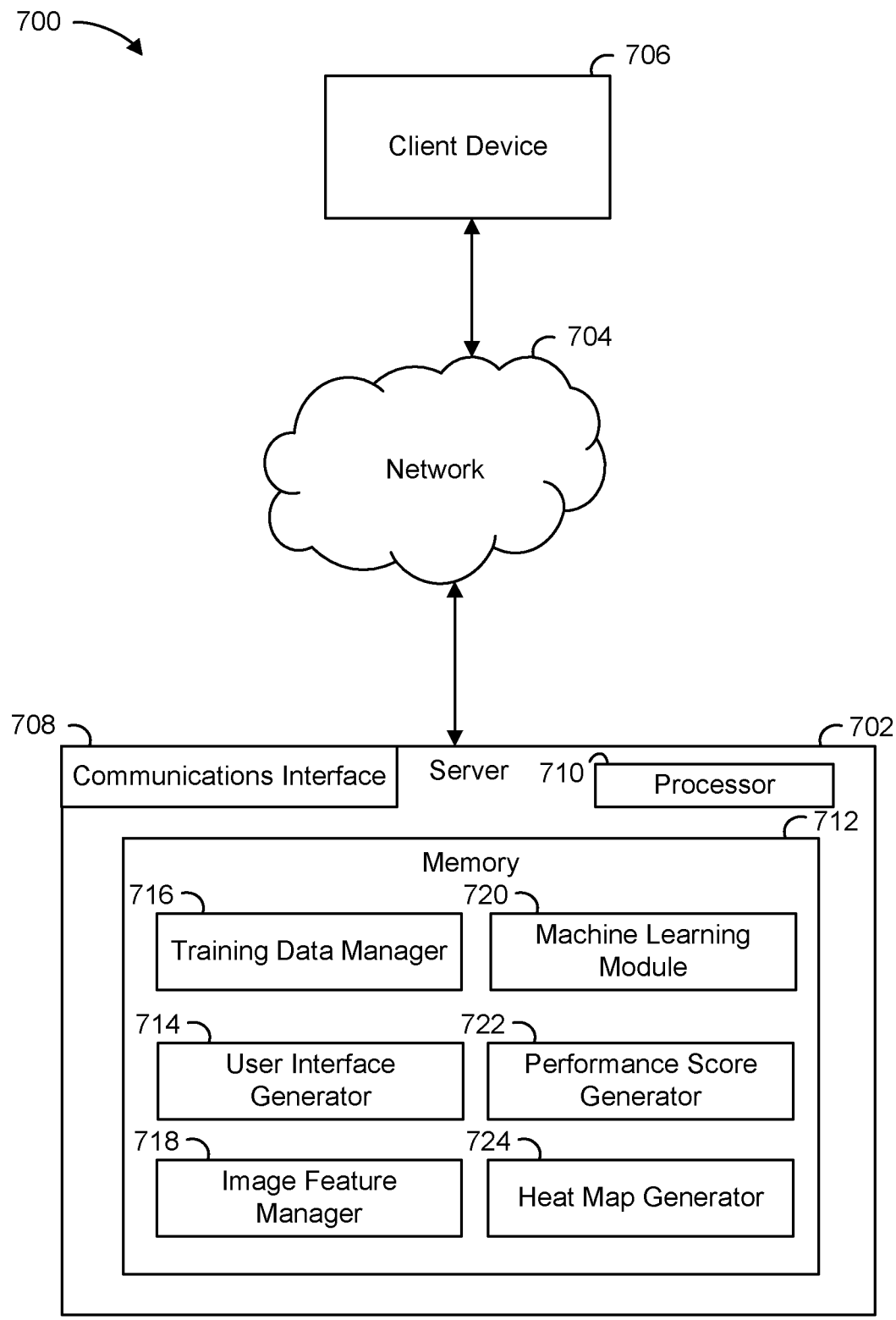
FIG. 7 illustrates a system configured for generating a performance score heat map for an image, in accordance with one or more implementations.

FIG. 7 illustrates a system 700 configured for generating a performance score heat map for an image, in accordance with one or more implementations. In some implementations, system 700 includes the same or similar components to system 100, shown and described with reference to FIG. 1. For example, system 700 may include a server 702, which may be similar to server(s) 102, a network 704, which may be similar to the network in FIG. 1, and a client device 706, which may be similar to client device 706. Client device 706 may communicate with server 702 over network 704.

As illustrated, server 702 may include a communications interface 708, a processor 710, and/or a memory 712. Communications interface 708 may utilize various wired communication protocols and/or short-range wireless communication protocols (e.g., Bluetooth, near-field communication ("NFC"), HDMI, RFID, ZigBee, Wi-Fi, etc.) to facilitate communication with client device 706. Processor 710 may include an ASIC, one or more FPGAs, a DSP, circuits containing one or more processing components, circuitry for supporting a microprocessor, a group of processing components, or other suitable electronic processing components. In some embodiments, processor 710 may execute computer code stored in memory 712 to facilitate the activities described herein. Memory 712 may be any volatile or non-volatile computer-readable storage medium capable of storing data or computer code relating to the activities. According to an exemplary embodiment, memory 712 may include computer code modules (e.g., executable code, object code, source code, script code, machine code, etc.,) for execution by processor 710. For example, memory 712 may include a user interface generator 714, a training data manager 716, an image feature manager 718, a machine learning module 720, a performance score generator 722, and/or a heat map generator 724.

Training data manager 716 may comprise instructions executable by one or more processors (e.g., processor 710) to generate sets of training images that correspond to different target audiences. The training images can be used to cause machine learning models to simulate the image preferences of such target audiences for candidate images that are input into the models. Training data manager 716 may train the machine learning models as described above using data generated for different target audiences. For example, training data manager 716 may train each machine learning model based on interaction data that is generated responsive to members of the respective target audiences viewing or interacting with the images. Training data manager 716 may determine an engagement metric for each image based on a ratio of the number of views the image receives to the number of interactions the image receives (e.g., the higher the number of interactions per view, the higher the engagement metric). Training data manager 716 may determine the engagement metric in any manner. Training data manager 716 may train a machine learning model with training data generated by a particular target audience by feeding images from the training data through the machine learning model, determining a difference between the engagement metric for the image and the output performance score, and back-propagating the difference through the machine learning model according to a loss function (or two loss functions in cases in which the neural network includes a classification layer in addition to a regression layer, as described above). Training data manager 716 may train the machine learning model using each image of the training data generated from the target audience to train the machine learning model to simulate the target audience. Training data manager 716 may repeat this process for multiple machine learning models using data generated by different target audiences to simulate such audiences. Thus, after sufficient training, systems implementing the systems and methods described herein may input the same image to different machine learning models to determine how different target audiences would interact with or react to different images.

User interface generator 714 may comprise instructions executable by one or more processors (e.g., processor 710) to generate a user interface for display on client devices that enables a user to initiate the determination of an image performance score for an image. Upon a selection of an application at client device 706, user interface generator 714 may present identifiers of the plurality of target audiences on a user interface, such as a web-based property. User interface generator 714 may present such identifiers to individually identify each of the target audiences. Such identifiers may include characteristics of the target audiences (e.g., gender and/or age) and/or content preferences of the target audiences (e.g., fishing, basketball, swimming, sports, drama, comedy, etc.). The identifiers may be text-based (e.g., strings), text next to a selectable box, image-based (e.g., pictures), or presented in a dropdown menu, and may be selectable by a user wishing to determine how a particular image would perform with the selected target audience. For example, the identifiers may be presented as text or a set of images on the user interface.

User interface generator 714 may receive an image. The image may have any subject such as an animal, a sport, a landscape background, etc. The image may be a PNG image, a JPEG, a PDF, etc. User interface generator 714 may receive the image across a network from a web-based property such as through an image search or from an image library stored by an image provider or from a local desktop (e.g., a user may upload the image from their computer). A user may select the image from the user interface to be evaluated to determine a performance score for the image.

User interface generator 714 may receive a selection of a target audience. The user may select the target audience from the presented identifiers associated with the target audiences. To select the target audience, the user may select one or more of the identifiers from the presented identifiers. For example, the user interface may display identifiers for different ages or genders of individuals. A user may wish to determine how well a particular image will perform with males aged 18-30. Accordingly, the user may select the identifiers associated with males aged 18-30 to indicate the machine learning model to use to determine the performance score of the image for the group (e.g., a machine learning model trained only using training data generated based on interactions with images by males aged 18-30). A user may select any number of identifiers to determine how images will perform with different subsets of people. Upon receiving the selection, image feature manager 718 may extract features from the image to generate a feature vector to input into the machine learning model trained based on training data that corresponds to the selected target audience.

In some embodiments, upon a user uploading an image to system 700 through user interface generator 714, image feature manager 718 may determine scores for multiple groups or target audiences. For example, a user can upload an image and image feature manager 718 may generate a feature vector from the image and send the feature vector to each or a pre-configured number of machine learning models representing different target audiences (e.g., target audiences that have been selected in the user's account with system 700) of machine learning module 720. Image feature manager 718 may execute of the machine learning models that received the feature vector to obtain a performance score for the corresponding target audiences. Performance score generator 722 may extract the performance scores from the machine learning models and store the models in memory 712. Consequently, when a user selects a target audience from user interface 714, user interface generator 714 may retrieve the performance score for the target audience from memory 712, as it has already been pre-processed. This process enables user interface generator 714 to update retrieve performance scores more quickly after the user selects a target audience, improving any latency that may occur as a result of processing an uploaded image after each selection on the user interface.

Image feature manager 718 may extract a plurality of features from the image. Image feature manager 718 may extract object, stylistic, and other such features from the image using the methods described above. Image feature manager 718 may generate a feature vector comprising the extracted features with values (e.g., values between zero and one) corresponding to each of the features. Machine learning module 720 may use the generated feature vector as an input into the machine learning model for the selected target audience to determine a performance score and to generate a heat map overlay for the image.

Machine learning module 720 may comprise instructions executable by one or more processors (e.g., processor 710) and comprise one or more machine learning models (e.g., support vector machines, neural networks, random forest, etc.). Machine learning module 720 may execute a neural network to obtain a performance score for the image. While the operations described herein may be described with reference to a neural network, such operations may be performed with any machine learning model to determine a performance score and a heat map for such performance score. Machine learning module 720 may execute the neural network using the generated feature vector as an input. In embodiments in which the machine learning model is a neural network, machine learning module 720 may propagate the feature vector through each layer of the neural network to obtain an output regression score indicating the performance score for the feature vector (e.g., the performance score for the image). In embodiments in which machine learning module 720 generates individual feature vectors for object features and stylistic features, machine learning module 720 may insert the stylistic features at a layer after the input layer of the neural network selected based on the size of the feature vector, as described above. The machine learning model may output the performance score for the image at the output layer of the neural network and machine learning module 720 may extract the performance score from the output layer. Machine learning module 720 may present the output performance score on a user interface on a client device to illustrate how the image would perform for the target audience that corresponds to the machine learning model. In some embodiments, the output performance score may additionally or instead indicate how the image would perform relative to other images for the target audience that the user wants to benchmark against. The other images could, for example, be images published by competitors, the user's own past images, an industry standard set of images, or a custom curated benchmark set of images. Performance score generator 722, which may comprise instructions executable by one or more processors (e.g., processor 710), may retrieve the output performance score from the output layer and present the performance score on the user interface being presented on client device 706.

The neural network may have a classification layer, a regression layer, or a combination of a classification layer and a regression layer (e.g., a classification layer that provides signals to a regression layer). The classification layer may generate a performance score probability for each of a plurality of classes that represent different performance score ranges (e.g., each performance score range may be its own class). The performance score probability may indicate a likelihood that the performance score would be in the particular performance score range. In cases in which the neural network includes a classification layer and a regression layer, each of the performance score probabilities may propagate to the regression layer of the neural network, which may use a regression algorithm to determine a performance score for the image at the output layer of the neural network based on the probabilities. As described above, by containing a classification layer and a regression layer in the neural network, the neural network may more accurately predict performance scores for images, which may be particularly useful for image processing given the large number of features that may be included in image feature vectors.

Further, by containing a classification layer in addition to a regression layer, the neural network may be able to account for more nuanced target audiences. For example, if a target audience consistently seems to find the same features in an image appealing (e.g., members of the target audience may interact with images that have the same features), the machine learning model for the audience may only need to include a regression layer to simulate the target audience because the model may be able to consistently predict scores for the same images. However, if a target audience is more sporadic in how they interact with images (e.g., some members interact with images containing a basketball while others do not) the neural network may be configured to include the classification layer to better hone in on the correct performance score for the image at the regression layer (e.g., the regression layer output may provide a more fine-tuned value instead of the ranges provided by the classification layer. The classification layer may help the model to be better trained in situations in which it may be difficult to train models that only have a regression layer to make performance score predictions on their own). In some embodiments, the neural network may include both a classification layer and a regression layer, but only the regression layer (e.g., the regression loss) may be trained to predict accurate outputs. Heat map generator 724 may determine the type of the neural network (e.g., a neural network that has a classification layer and a regression layer, a neural network that only has a regression layer, or a neural network that only has a classification layer) that predicted the performance score to determine how to generate a heat map for the image indicating the features that most impacted the performance score.

Heat map generator 724 may extract values from signals between the two final layers of a neural network, in some cases regardless of whether the neural network has a classification layer, a regression layer, or a combination of the two layers. For example, in cases in which the neural network only has a regression layer after its hidden layers, heat map generator 724 may extract the values from the signals that provide inputs to the regression layer. In cases in which the neural network has a classification layer before a regression layer, heat map generator 724 may extract the probabilities from the signals that the classification layer provides to the regression layer. In cases in which the neural network only has a classification layer, heat map generator 724 may extract the pre-softmax values for each of the classes (e.g., each range of performance scores) from the signals between the last hidden layer and the classification layer.

Heat map generator 724 may back-propagate the values from the signals through the neural network. Heat map generator 724 may back-propagate the values back through the neural network starting from the final prediction layer of the neural network (e.g., from the regression layer or the classification layer depending on which layer is the final prediction layer of the neural network). Such back-propagation techniques may cause the neural network to output, at the input layer of the neural network, an impact score for each of the features of the image. An impact score may indicate an impact (e.g., positive or negative and the magnitude of such impact) the feature had on the performance score of the image. Thus, heat map generator 724 may be able to calculate the impact different portions of the image had on its performance score for the target audience that corresponds to the machine learning model.

Heat map generator 724 may extract an impact score for each of the plurality of features from the input layer of the neural network. After back-propagating the values through the neural network, heat map generator 724 may extract the impact scores from the input layer of the neural network. Heat map generator 724 may determine, for each feature, whether the feature had a positive impact or a negative impact on the performance score. Heat map generator 724 may make this determination by identifying whether the extracted value corresponding to the feature is positive or negative. For instance, a positive value for a feature may correspond to a positive impact while a negative value may correspond to a negative impact on the performance score. Heat map generator 724 may determine whether each feature had a positive or a negative impact on the performance score based on the values that heat map generator 724 extracts from the input layer.

In some embodiments, in cases in which the neural network only includes a classification layer, heat map generator 724 may determine whether the individual features had a positive or a negative impact on a predicted performance score based the impact the features had on the different potential classes (e.g., performance score ranges). Such may be advantageous when the neural network outputs confidence scores for different performance score ranges and performance score generator 722 determines a performance score for an image by based on the confidence scores using a regression technique (e.g., multiplying a value corresponding to each range (e.g., an average of the range or a value within the range) by the confidence score for the respective range and aggregating the resulting values). For example, heat map generator 724 may assign indications to the different classes to indicate whether the respective classes have a positive or negative influence on a predicted performance score for an image. After the neural network predicts confidence scores for each class based on an image input, heat map generator 724 may back-propagate extracted pre-softmax values through the neural network and identify the different classes to which each of the input features correspond (e.g., the classes that the features predicted). Heat map generator 724 may identify whether the classes are associated with a positive or negative indication and determine any features that were used to predict a class that is associated with a positive indication had a positive impact on the performance score and any features that were used to predict a class that is associated with a negative indication had a negative impact on the performance score.

In some embodiments, heat map generator 724 may determine the magnitude of the impact that the different features had in determining the performance score for an image using a model that has a classification layer without a regression layer. In such embodiments, heat map generator 724 may assign magnitudes to the different classes and determine the magnitudes for the features based on the magnitudes for the classes that the respective features were used to predict. For example, the neural network may include outputs for 10 classes that correspond to different performance score ranges (e.g., ranges of 1-10, 11-20, 30-40, etc.). Heat map generator 724 may assign weights to the different classes based on a distance the ranges of the classes are from a set value (e.g., a median or average of a combination of the ranges, such as 50). For instance, heat map generator 724 may assign high weights to classes that correspond to values that have the largest distance from a performance score of 50 (e.g., heat map generator 724 may assign the highest positive weight to a performance score range of 91-100, the lowest positive weight to a performance score range of 51-60, the highest negative weight to a performance score range of 1-10, and the lowest negative weight to a performance score range of 41-50). Heat map generator 724 may determine the magnitude of each feature's impact by identifying the magnitude that corresponds to the class the feature predicted.

Responsive to determining a feature (or an aggregation of a plurality of features as described below) had a positive impact on the performance score for the image, heat map generator 724 may select a first color or visual treatment for the feature. The first color may be any color such as red, green, yellow, blue, etc. For example, the feature may be associated with a soccer ball object. This association may have caused the feature to have had a positive impact on the performance score for the image. Heat map generator 724 may determine the feature is associated with a positive value and select the first color that corresponds to positive performance based on the association. Heat map generator 724 may select the color from a database stored in a memory of heat map generator 724 or from another storage location (e.g., a non-transitory computer-readable medium). Heat map generator 724 may assign the selected color to the feature.

However, responsive to determining the feature had a negative impact on the performance score for the image, heat map generator 724 may select a second color for the feature. The second color may be a different color from the first color and represent that the associated feature had a negative impact on the performance score of the image. For example, the feature may be associated with a moon object. This association between the feature and the moon object may have caused the feature to have had a negative impact on the performance score for the image. Heat map generator 724 may determine the feature is associated with a negative value and select, from memory or another storage location, the second color that corresponds to the negative performance based on the association. Heat map generator 724 may assign the selected color to the feature.

Heat map generator 724 may determine color intensity based on the impact scores. The color intensity may be or correspond to a color saturation, tint, shade, or degree of purity of the color. Heat map generator 724 may determine the color intensity on a sliding scale so that higher impact scores may correspond to higher color intensities. For example, heat map generator 724 may determine a first feature had a large positive impact (e.g., caused the performance score to increase) on the performance score of the image. Heat map generator 724 may also determine a second feature had a small negative impact (e.g., caused the performance score to decrease) on the performance score for the image. Accordingly, heat map generator 724 may assign the color blue with a high intensity to the first feature and the color red with a low intensity to the second feature. Heat map generator 724 may determine color intensities for each feature of the feature vector that was used as an input into the machine learning model. Heat map generator 724 may be configured to determine colors and color intensities using any colors and/or intensities for any number of features.

Heat map generator 724 may identify locations (e.g., pixels or portions) of features. In some embodiments, the impact scores for the features may correspond to different pixels or sets of pixels of the image. Heat map generator 724 may determine which pixel, set of pixels, or portion of the image corresponds to which feature based on the index value of the feature within the feature vector. For instance, one index value of the feature vector may correspond to one pixel, set of pixels, or portion while another index value may correspond to another pixel, set of pixels, or portion. Heat map generator 724 may identify the locations on the image that correspond to the impact scores based on the index values.

In some embodiments, a location may correspond to more than one feature. In such embodiments, heat map generator 724 may determine an impact score and color for the location based on each of the features that corresponds to the location. For example, a location may correspond to a blue feature and a soccer ball object feature. Heat map generator 724 may determine impact scores for each of these features and determine a color for the region based on a combination (e.g., an average) of the impact scores for the two features. Heat map generator 724 may determine a color for a location based on impact scores for any number of features or locations.

Heat map generator 724 may generate a heat map overlay using the selected colors. Heat map generator 724 may generate the heat map overlay by identifying the index values and colors of the respective features and assigning the colors that correspond to the features to locations on an overlay that correspond to the index values of the respective features. For example, heat map generator 724 may determine a color and color intensity for a feature and identify the location on the heat map that corresponds to the index value of the feature. Heat map generator 724 may assign or apply the color, in some cases with the color intensity, to the portion of the heat map overlay that corresponds to the identified location of the feature. Heat map generator 724 may iteratively repeat this process until each portion of the overlay has been colored with colors indicating the impact the corresponding portion of the image had on the performance score for the image. Heat map generator 724 may generate a heat map overlay that illustrates how and to what degree the different portions of the image impacted the performance score of the image.

In some embodiments, heat map generator 724 may be configured to only illustrate an impact score for a feature of an image on an overlay if the respective impact score exceeds a threshold. For example, heat map generator 724 may extract impact scores for individual features from the input layer of the neural network and compare the impact scores to a threshold. For any negative impact scores, heat map generator 724 may take the absolute value of the impact score and compare the value to a positive threshold or compare the negative impact score to a negative threshold. Heat map generator 724 may identify any impact scores that do not exceed the respective threshold or, in the case of negative impact scores that are compared to a negative threshold, that are below the threshold. Heat map generator 724 may be configured to determine features that are not associated with an impact score that exceeds a threshold to not have a corresponding score for the heat map overlay, and be "clear" (e.g., not be associated with any color) or be associated with a third color at its corresponding location on the overlay. Thus, heat map generator 724 may generate the overlay to clearly present the portions of the image that impacted the performance score while removing any noise that did not have a substantial effect on the score.

In some embodiments, heat map generator 724 may generate multiple heat map overlays for an image. Each heat map overlay may be configured to only include one color (e.g., a color that corresponds to a positive impact, a color that corresponds to a negative impact, or a color that corresponds to no impact) at the locations that heat map generator 724 determines correspond to the respective color. For example, heat map generator 724 may generate a first overlay that only illustrates portions of an image that had a positive impact, a second overlay that only illustrates portions of an image that had a negative impact, and/or a third overlay that only illustrates portions of an image that did not have any impact. A user may access a user interface to request which of the overlays to view to see an uncluttered image overlaid by one color. In some embodiments, heat map generator 724 may further generate a heat map overlay that includes any combination of the colors.

Heat map generator 724 may generate an evaluation image. Heat map generator 724 may generate the evaluation image by placing the heat map overlay over the image. Heat map generator 724 may place the overlay over the image by appending the overlay to the image. Heat map generator 724 may match the outlines of the overlay to the outlines of the image when placing the overlay over the image to generate the evaluation image. In some embodiments, heat map generator 724 may place the heat map overlay over the image by changing pixels or portions of the image to have a colored tint determined as described herein. Heat map generator 724 may present the evaluation image on a user interface to a user. In embodiments in which heat map generator 724 generates multiple overlays for the image each corresponding to a different color or impact, heat map generator 724 may generate an evaluation image for each overlay and display the evaluation images to a user. In some embodiments, the user may interact with the evaluation image by placing a mouse or cursor over different portions of the image to view the numerical impact the portion of the image had on the image's impact score. In such embodiments, heat map generator 724 may identify the location of the cursor or mouse over the image or the overlay, identify the feature associated with the location, and retrieve the impact score associated with the feature and/or a description of the feature. Heat map generator 724 may then display the impact score on the user interface so the user can see the impact the feature had on the performance score for the image as well as a description of the feature.

In some embodiments, the colors that represent the impact score may represent a combination of one or more features that may impact the performance score of the image. For instance, the colors may be determined as a function of one or more features. Heat map generator 724 may determine impact scores for multiple features that are displayed in the same region at once (e.g., a red soccer ball may represent a soccer ball feature and color red feature). Heat map generator 724 may determine a total impact score of the combination of features that affect the same area by aggregating or taking an average of the impact scores of each feature. Heat map generator 724 may use the determined total impact score to determine the color to display in the area of the picture that is represented by each of the features.

In some embodiments, heat map generator 724 may determine a text-based representation of multiple features where combinations of multiple features correspond to words representing the image. Using the systems and methods described herein, heat map generator 724 may evaluate how a word representing the image has a positive or negative impact on the performance score for the image. Such words may be input by a user or automatically determined by a machine learning model that extracts features from the image. Such determined words may be input into the neural network and heat map generator 724 may determine impact scores for the words to generate a heat map as described above to generate a heat map for the image.

In some embodiments, instead of generating a heat map overlay, heat map generator 724 may generate other indications of the impact score that features had on the performance score for the image. For example, text that corresponds to different impact scores may be stored in a database or in memory 712. Such text may be a numerical value indicating the value and/or whether the impact was positive or negative. In other embodiments, the text may be various adjectives such as "strong impact," "no impact," "little impact," "negative impact," etc. The text may be any adjective or description. Heat map generator 724 may use the predicted impact scores and compare scores to the text to determine the text that corresponds to the predicted scores. Heat map generator 724 may identify the text that corresponds to the score, retrieve the text from memory 712, and present the text on the user interface to a user, in some cases adjacent to text indicating the feature that is associated with the impact score. Thus, the user may easily see the impact different features had on the impact score.

Figure 8:
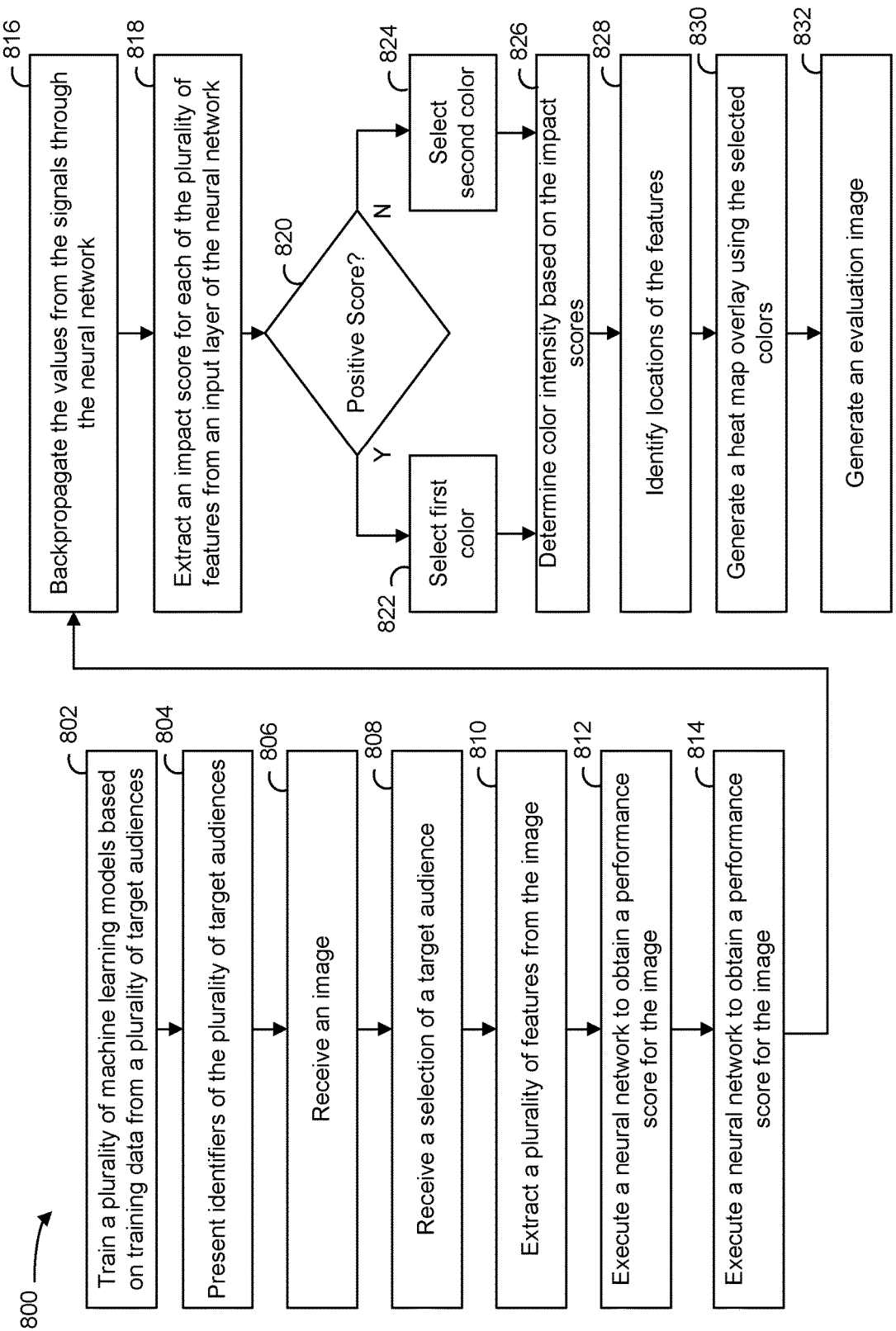
FIG. 8 illustrates a method for generating a performance score heat map for an image, in accordance with one or more implementations.

FIG. 8 illustrates a method 800 for generating a performance score heat map for an image, in accordance with one or more implementations. Method 800 can be performed by a data processing system (e.g., server 702, client device 706, a server system, etc., etc.). Method 800 may include more or fewer operations and the operations may be performed in any order. Performance of method 800 may enable the data processing system to generate performance scores for individual images using a machine learning model to indicate how the images will likely perform with a target audience (e.g., a likelihood the target audience will interact with the image). The data processing system may extract values (e.g., weights) from the machine learning model that were generated by the machine learning model when generating the performance score and feed the values back through the model to obtain indications of how different features of the image impacted the performance score. The data processing system may then use the indications to generate a heat map overlay that corresponds to different portions of the image to indicate whether the respective portions positively or negatively impacted the image's performance score.

At an operation 802, the data processing system may train a plurality of machine learning models. The data processing system may train the machine learning models as described above using data generated for different target audiences. For example, each machine learning model may be trained based on interaction data that is generated responsive to members of the respective target audiences viewing or interacting with the images. The data processing system may determine an engagement metric for each image based on a ratio of the number of views the image receives to the number of interactions the image receives (e.g., the higher the number of interactions per view, the higher the engagement metric). The data processing system may train a machine learning model with training data generated by a particular target audience by feeding images from the training data through the machine learning model, determining a difference between the engagement metric for the image and the output performance score, and backpropagating the output through the machine learning model according to a loss function based on the determined difference. The data processing system may train the machine learning model using each image of the training data generated from the target audience to train the machine learning model to simulate the target audience. The data processing system may repeat this process for multiple machine learning models using data generated by different target audiences to simulate such audiences. The data processing system may repeat this process for multiple performance metrics (one such metric being the engagement metric) for one or more target audiences to simulate different types of behavior and business metrics (or "KPIs") that are influenced by the audience. Thus, systems implementing the systems and methods described herein may input the same image to different machine learning models to determine how different target audiences would interact or react to different images.

At an operation 804, the data processing system may present identifiers of the plurality of target audiences. The data processing system may present such identifiers on a user interface, such as a web-based property, that individually identify each of the target audiences. Such identifiers may include characteristics of the target audience (e.g., gender and/or age) and content preferences of such target audiences (e.g., fishing, basketball, swimming, sports, drama, comedy, etc.). Such identifiers may be text-based (e.g., strings) or image-based (e.g., pictures) and may be selectable by a user wishing to determine how a particular image would perform with the selected target audience. For example, the identifiers may be shown as a text list, a set of selectable boxes, a set of images, or as a drop-down list on a user interface.

At an operation 806, the data processing system may receive an image. The image may have any subject such as an animal, a sport, a landscape background, etc. The data processing system may receive the image across a network from a web-based property such as through an image search or from an image library stored by an image provider or from a local desktop. A user may select the image from the user interface to be evaluated to determine a performance score for the image.

At an operation 808, the data processing system may receive a selection of a target audience. The user may select the target audience from the presented identifiers associated with the target audiences. To select the target audience, the user may select one or more of the identifiers from the presented identifiers. For example, the user interface may display identifiers for different ages or genders of individuals. The identifiers may be the age ranges or a description of the genders (e.g., male or female). A user may wish to determine how well a particular image will perform with males aged 18-30. Accordingly, the user may select the identifiers associated with males aged 18-30 to indicate the machine learning model to use to determine the performance score of the image for the group. A user may select any number of identifiers to determine how images will perform with different subsets of people.

At an operation 810, the data processing system may extract a plurality of features from the image. The data processing system may extract object, stylistic, and other such features from the image using the methods described above. The data processing system may generate a feature vector comprising the extracted features with values corresponding to each of the features. In some embodiments, the data processing system may generate a feature vector for the object features and a feature vector for the stylistic features, or a feature vector that comprises or concatenates both such features.

At an operation 812, the data processing system may execute a neural network to obtain a performance score for the image. The data processing system may execute the neural network using the generated feature vector as an input. In embodiments in which the machine learning model is a neural network, the data processing system may propagate the feature vector through each layer of the neural network to obtain an output regression score indicating the performance score for the feature vector. In embodiments in which the data processing system generates individual feature vectors for object features and stylistic features, the data processing system may insert the stylistic features at a layer after the input layer of the neural network selected based on the size of the feature vector, as described above. The machine learning model may output the performance score for the image at the output layer of the neural network and the data processing system may extract the performance score from the output layer. The data processing system may present the output performance score on a user interface on a client device to illustrate how the image would perform for the target audience that corresponds to the machine learning model.

In some embodiments, the neural network may have a classification layer and a regression layer. The classification layer may generate a performance score probability for each of a plurality of classes that represent different performance score ranges. The performance score probability may indicate a likelihood that the performance score would be in the particular performance score range. Each of the performance score probabilities may propagate to the regression layer of the neural network, which may use a regression algorithm to determine a performance score for the image at the output layer of the neural network. As described above, by containing a classification layer and a regression layer in the neural network, the neural network may more accurately predict performance scores for images, which is particularly useful for image processing given the large number of features that are included in image feature vectors.

Further, by containing a classification layer in addition to a regression layer, the neural network may be able to account for more nuanced target audiences. For example, if a target audience consistently seems to find the same features in an image appealing, the machine learning model for the image may only need to include a regression layer to simulate the target audience because the model may be able to consistently predict scores for the same images. However, if a target audience is more sporadic in how they interact with images (e.g., some members interact with images containing a basketball while others do not) the neural network may be configured to include the classification layer to better hone in on the correct performance score for the image at the regression layer.

At an operation 814, the data processing system may extract values from signals between the two final layers of a neural network, in some cases regardless of whether the neural network has a classification layer, a regression layer, or a combination of the two layers. For example, in cases in which the neural network only has a regression layer after its hidden layers, the data processing system may extract the values from the signals that provide inputs to the regression layer. In cases in which the neural network has a classification layer before a regression layer, the data processing system may extract the probabilities from the signals that the classification layer provides to the regression layer. In cases in which the neural network only has a classification layer, the data processing system may extract the pre-softmax values for each of the classes (e.g., each range of performance scores) from the signals between the hidden layer and the classification layer.

At an operation 816, the data processing system may back-propagate the values from the signals through the neural network. The data processing system may back-propagate the values back through the neural network at the final prediction layer of the neural network. For example, in embodiments in which the data processing system extracts values from the signals between the classification layer and the regression layer, the data processing system may back-propagate the probabilities that the data processing system extracted through the neural network starting at the regression layer. In embodiments in which the data processing system extracts values from the signals between the last hidden layer of the neural network and the regression layer, the data processing system may also back-propagate the values through the neural network starting at the regression layer. In embodiments in which the data processing system extracts values from signals between the last hidden layer and a classification layer, the data processing system may back-propagate the values through the neural network starting at the classification layer. Such back-propagation techniques may cause the neural network to output, at the input layer of the neural network, an impact score for each of the features of the image. An impact score may indicate an impact (e.g., positive or negative and the magnitude of such impact) the feature had on the performance score of the image. Thus, the data processing system may be able to calculate the impact different portions of the image had on its performance score for the target audience that corresponds to the machine learning model.

At an operation 818, the data processing system may extract an impact score for each of the plurality of features from the input layer of the neural network. After back-propagating the values through the neural network, the data processing system may extract the impact scores from the input layer of the neural network. At an operation 820, the data processing system may determine, for each feature, whether the feature had a positive impact or a negative impact on the performance score. The data processing system may make this determination by identifying whether the extracted value corresponding to the feature is positive or negative. For instance, a positive value for a feature may correspond to a positive impact while a negative value may correspond to a negative impact on the performance score. The data processing system may determine whether each feature had a positive or a negative impact on the performance score based on the values that the data processing system extracts from the input layer.

Responsive to determining a feature had a positive impact on the performance score for the image, at an operation 822, the data processing system may select a first color for the feature. The first color may be any color such as red, green, yellow, blue, etc. For example, the feature may be associated with a soccer ball object. This association may have caused the feature to have had a positive impact on the performance score for the image. The data processing system may determine the feature is associated with a positive value and select the first color that corresponds to positive performance based on the association. The data processing system may select the color from a database stored in a memory of the data processing system or from another storage location (e.g., a non-transitory computer-readable medium). The data processing system may assign the selected color to the feature.

However, responsive to determining the feature had a negative impact on the performance score for the image, at an operation 824, the data processing system may select a second color for the feature. The second color may be a different color from the first color and represent the associated feature had a negative impact on the performance score of the image. In some embodiments, the data processing system may select a third color for feature that is determine not to have an impact on the performance score or an impact that does not exceed a threshold. For example, the feature may be associated with a moon object. This association between the feature and the moon object may have caused the feature to have had a negative impact on the performance score for the image. The data processing system may determine the feature is associated with a negative value and select, from storage, the second color that corresponds to the negative impact based on the association. The data processing system may assign the selected color to the feature.

At an operation 826, the data processing system may determine color intensity based on the impact scores. The color intensity may be or correspond to a color saturation, tint, shade, or degree of purity of the color. The data processing system may determine the color intensity on a sliding scale so that higher impact scores may correspond to higher color intensities. For example, the data processing system may determine a first feature had a large positive impact (e.g., an impact causing the performance score to increase) on the performance score of the image. The data processing system may also determine a second feature had a small negative impact (e.g., an impact causing the performance score to drop) on the performance score for the image.

Accordingly, the data processing system may assign the color blue with a high intensity to the first feature and the color red with a low intensity to the second feature. The data processing system may determine color intensities for each feature of the feature vector that was used as an input into the machine learning model. The data processing system may be configured to determine colors and color intensity using any colors and/or intensities for any number of features.

At an operation 828, the data processing system may identify locations of features. In some embodiments, the impact scores for the features may correspond to different pixels or sets of pixels of the image. The data processing system may determine which one pixel, set of pixels, or portion of the image corresponds to which feature based on the index value of the feature within the feature vector. For instance, one index value of the feature vector may correspond to one pixel, set of pixels, or portion while another index value may correspond to another pixel, set of pixels, or portion. The data processing system may identify the locations on the image that correspond to the impact scores based on the index values.

In some embodiments, multiple index values may correspond to the same pixel, set of pixels, or portion. In such embodiments, the data processing system may take an average value of the impact scores (or perform any other function on the impact scores) of the index values that correspond to the same pixel, set of pixels, or portion and determine a color for the area based on the average value.

At an operation 830, the data processing system may generate a heat map overlay using the selected colors. The data processing system may generate the heat map overlay by identifying the index values and colors of the respective features and assigning the colors that correspond to the features to locations (e.g., pixels or portions) or regions (e.g., an area of the image including multiple locations) of an overlay that correspond to the index values of the respective features. For example, the data processing system may determine a color and color intensity for a feature and identify the location on the heat map that corresponds to the index value of the feature. In another example, the data processing system may determine an average of multiple features that have locations within the same region of the image and determine a color and color intensity for the region based on the average. The data processing system may assign or apply the color, in some cases with the color intensity, to the portion of the heat map overlay that corresponds to the identified location or region of the feature or features. The data processing system may iteratively repeat this process until each portion of the overlay has been colored with colors indicating the impact the corresponding portion of the image had on the performance score for the image. The data processing system may generate a heat map overlay that illustrates how and to what degree the different portions of the image impacted the performance score of the image.

In some embodiments, the data processing system may be configured to only illustrate impact scores for an image on an overlay if the respective impact scores exceed a threshold. For example, the data processing system may extract impact scores for individual features from the input layer of the neural network and compare the impact scores to a threshold. For any negative impact scores, the data processing system may take the absolute value of the impact score and compare the value to a positive threshold or compare the negative impact score to a negative threshold. The data processing system may identify any impact scores that do not exceed the respective threshold or, in the case of negative impact scores that are compared to a negative threshold, that are below the threshold. The data processing system may be configured to determine features that are not associated with an impact score that exceeds a threshold to not have a corresponding score for the heat map overlay, and instead be "clear" (e.g., not be associated with any color) at its corresponding location on the overlay. Thus, the data processing system may generate the overlay to clearly present the portions of the image that impacted the performance score while removing any noise that did not have a substantial effect on the score.

At an operation 832, the data processing system may generate an evaluation image. The data processing system may generate the evaluation image by placing the heat map overlay over the image. The data processing system may place the overlay over the image by appending the overlay to the image. The data processing system may match the outlines of the overlay to the outlines of the image when placing the overlay over the image to generate the evaluation image. The data processing system may present the evaluation image on a user interface to a user. In some embodiments, the user may interact with the evaluation image by placing a mouse or cursor over different portions of the image to view the numerical impact the portion of the image had on the image's impact score. In such embodiments, the data processing system may identify the location of the cursor or mouse over the image or the overlay, identify the feature associated with the location, and retrieve the impact score associated with the feature. The data processing system may then display the impact score on the user interface so the user can see the exact the impact the feature had on the performance score for the image.

Figure 9:
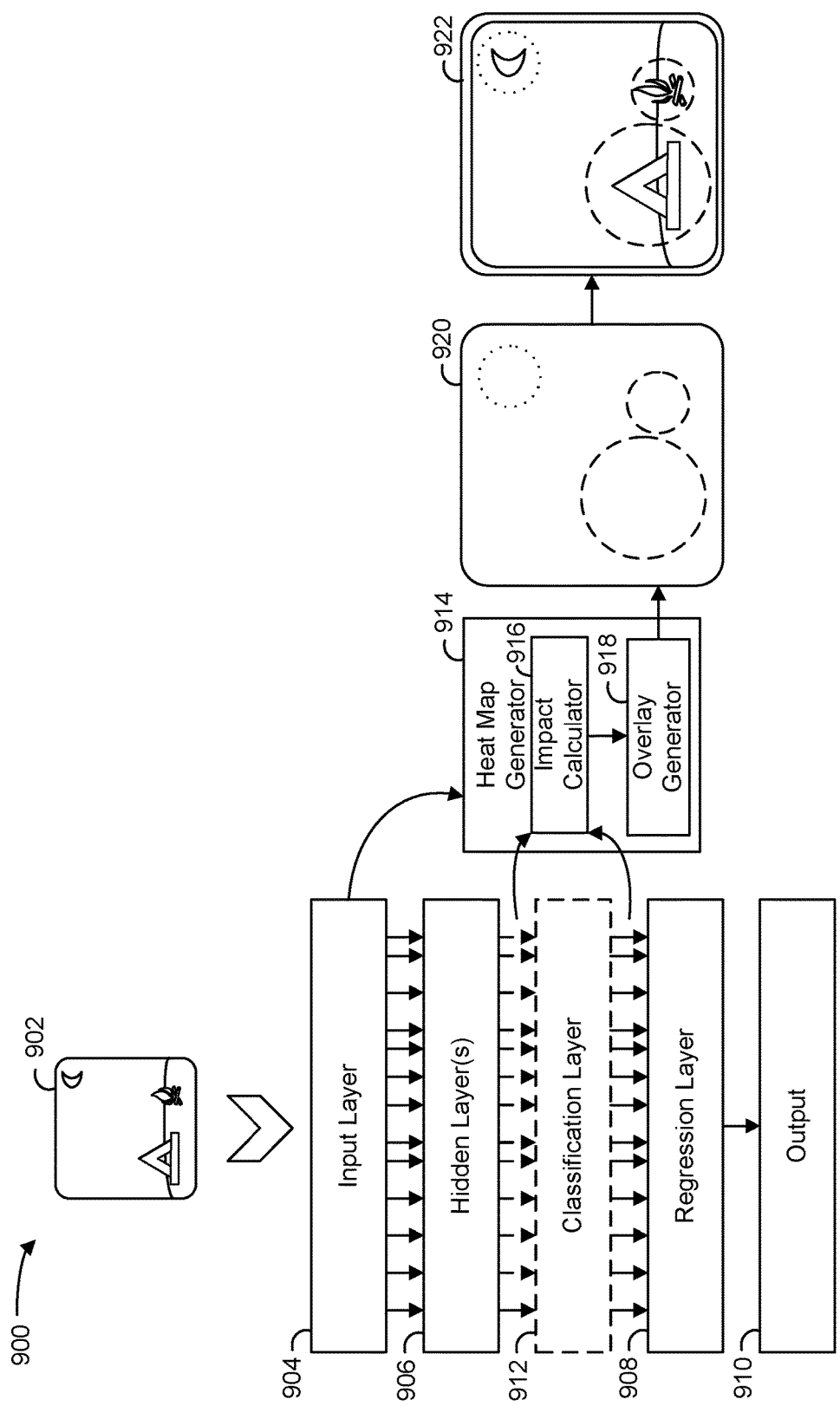
FIG. 9 illustrates an example data flow for generating a performance score heat map for an image, in accordance with one or more implementations.

FIG. 9 illustrates an example data flow 900 for generating a performance score heat map for an image, in accordance with one or more implementations. In data flow 900, a data processing system may insert an image 902 including a tent, a campfire, and a moon into a neural network. The neural network may have been trained using training data generated using interaction data from a target audience such as, for example, a set of females or males aged 50-60. The data processing system may insert the image into an input layer 904 of the neural network and execute the neural network to propagate signals through hidden layers 906, a regression layer 908, and/or an output layer 910 of the neural network. The data processing system may extract a performance score from the output layer that simulates how or whether the target audience would interact with the image if a member of the audience viewed the image while browsing the Internet.

In some embodiments, the neural network may include a classification layer 912. Classification layer 912 may receive signals from the last hidden layer of hidden layer(s) 906 and determine probabilities for a plurality of "performance score ranges." Each performance score range may correspond to ranges of performance score values. For example, classification layer 912 may be configured to output probabilities that the performance score for image 902 should be between 1 and 10, 11 and 19, 20 and 29, etc. Classification layer 912 may output probabilities for any number of confidence scores for any number of ranges. The ranges may have any size. Classification layer 912 may output such probabilities to regression layer 908, which may aggregate the probabilities as described above to determine the performance score for image 902.

Upon generating the performance score, the data processing system may execute heat map generator 914. Heat map generator 914 may comprise instructions that are executable by one or more processors to generate a heat map for image 902 to illustrate how different portions of image 902 impacted the determined performance score. Heat map generator 914 may include an impact calculator 916 and an overlay generator 918. Impact calculator 916 may be configured to retrieve the weights or, depending on the configuration of the neural network, probabilities from the signals between hidden layer(s) 906 or classification layer 912. Impact calculator 916 may back-propagate the weights or probabilities through the neural network back through the final layer of the neural network (e.g., classification layer 912 and/or regression layer 908) and/or hidden layer(s) 906 to input layer 904. Impact calculator 916 may retrieve output impact scores for the different features of image 902 that were generated based on the backpropagation.

Upon retrieval of the impact scores for image 902, overlay generator 918 may determine color and color intensities or tints for each of the features. Overlay generator 918 may do so by comparing the retrieved impact scores to a database within the data processing system that stores correlations between impact scores and different colors or color intensities. For instance, overlay generator 918 may determine a feature to be associated with the color green based on a comparison indicating a positive impact score associated with the feature is associated with the color green. Overlay generator 918 may determine another feature to be associated with the color red based on a comparison indicating a negative impact score associated with the feature is associated with the color red. Overlay generator 918 may determine colors for each feature of image 902 and determine intensities for the features based on the magnitude of each impact score (e.g., scores with a higher magnitude may have higher impact scores). Overlay generator 918 may determine locations that correspond to each of the features based on the feature vector index scores associated with the features and generate a heat map overlay 920 to have colors at the determined locations.

As illustrated, overlay generator 918 may have a first color on locations on heat map overlay 920 that corresponds to the campfire and tent of image 902 and a second color that corresponds to the moon of image 902. Overlay generator 918 may have caused the first color to indicate a positive impact and the second color to indicate a negative impact. Overlay generator 918 may have caused other portions of heat map overlay 920 to not have any color responsive to determining the impact scores of the portions did not exceed a threshold. Thus, overlay generator 918 may have generated heat map overlay 920 to illustrate how the different portions of image 902 impacted the performance score for image 902.

Overlay generator 918 may place heat map overlay 920 over image 902 to generate evaluation image 922. Evaluation image 922 may be configured to clearly illustrate which portions of image 902 had a positive or negative impact on the performance score for the image to a user. Thus, a user may view this information and determine visual information to include in future images for the target audience that corresponds to the neural network. For example, the user may see that the tent is overlaid by a dark green color and the moon is overlaid by a dark red color and decide to use images that include more tents and fewer moons in pictures that are intended to be viewed by members of the target audience. In an alternative scenario, the user may notice that because the moon is overlaid by a dark red color, perhaps the user should experiment with different visual presentations of a moon in the image. That is, features colored in red may signal that the features should be removed entirely from the composition, and they also may signal that the features colored in red represent "opportunity areas" (e.g., areas to adjust or experiment with to better achieve a desired outcome by the user).

In an example embodiment of the present disclosure, a user may access an application (e.g., a web-based application or a mobile application) that enables the user to select and/or upload images to be evaluated to determine how the images will perform with different target audiences. A system may have pre-trained stored machine learning models (e.g., neural networks) that have each been trained based on interaction and/or viewing data of a particular target audience with different images. An interface for the application may present (e.g., as a list or in a drop-down menu) selectable identifications of multiple target audiences (e.g., characteristics of the target audiences such as male, female, a specific age range, different hobbies, etc.). The user may select or upload an image and select one of the target audience characteristics to select a machine learning model to use to evaluate the image.

The user may select different target audiences for the same image to view how the image would perform with different subsets of people (e.g., target audiences). For example, for the same image, the user may select male as a target audience and separately select female as a target audience. The machine learning models for each target audience may separately evaluate the image and output performance scores indicating how the images would perform with the respective target audience. Because the machine learning models were trained using training data generated based on interactions by different target audiences, the output performance scores by the models may vary significantly, despite both models evaluating the same image. The data processing system may then implement the systems and methods described herein to generate a heat map overlay for each model's evaluation that indicates how the different portions of the image impacted the performance score predicted by the respective model. Similar to the reasons the performance scores differed, because the training data that was used to train each model was generated based on interactions by different target audiences, different portions of the image may have had different magnitudes and/or effects (e.g., positive or negative effects) on the performance scores between the machine learning models, creating different color patterns for each overlay. A user may select any number of characteristics (or combination of characteristics in some instances) to view how different audiences would perceive different images. Thus, the user may easily evaluate different images and determine the best images to present to the respective target audiences.

Advantageously, by implementing the systems and methods described herein, a data processing system may be able to determine the performance scores for images for different target audiences while determining the impact different portions of the images had on such performance scores. A user may be able to adjust how images are taken and/or objects, scenes, settings, colors, compositional elements, and other visual features that are included in the images to increase how the images will perform with target audiences. By manipulating the data generated by executing a machine learning model, the data processing system may be able to evaluate each image and provide feedback to a user to indicate which features of the images helped and/or hurt each image's score in an accessible interface that enables users to easily see why an image performed well or poorly.

In some embodiments, a system implementing the systems and methods described herein may use the system of machine learning models that simulate different target audiences to evaluate videos. In such embodiments, the system may receive a video and identify individual frames of the video. The system may extract the frames from the video and sequentially apply the frames to a machine learning model trained to simulate a target audience (e.g., a selected target audience) to obtain a performance score for the individual frames. The system may apply the frames to multiple machine learning models to determine how the frames would perform with multiple target audiences. For each frame, upon obtaining the performance score for the frame, the system may present the performance score on a user interface, in some cases at a location on the user interface adjacent to the frame. The system may analyze the frame using the systems and methods described herein to determine the impact different features of the frame had on the performance score and generate an indication (e.g., a heat map or a text description) illustrating the impact that different features of the image had on the determining the performance score for the frame. Thus, the system may determine how individual frames of a video would perform with different target audiences and how different portions of the frame impacted the performance score for each target audience.

In some embodiments, the system may be further configured to determine performance scores for a portion of a video that includes multiple frames. In such embodiments, the system may be configured to analyze a set of number of frames or a set time period of a video. The set number of frames may include any number of frames of the video up to the entire video and the set time period may be any portion of the video up to the entire video. The system may determine one or more performance scores (e.g., performance scores for one or more target audiences) for each of the frames within the set number of frames or within the set time period and determine an average of the one or more performance scores to determine a performance score for the set number of frames or set time period. The system may display the performance score on a user interface with an indication of the frames or time period that the performance score represents or to which the frames or time period correspond. In some cases, the system may display the performance score adjacent to a video displaying the frames or time period to which the performance score corresponds. The system may iteratively repeat the process to determine and display performance scores for different sets of frames or time periods of a video and using different machine learning models so a user can more easily view how portions of a video will perform with different target audiences.

In some embodiments, the system may determine the performance score for a video using a moving time window. For example, the data processing system may determine a performance score for a video or for a time period of a moving time window that has a fixed width (e.g., number of frames or frames within a time period) and increment the moving time window a predetermined number of frames and/or for a predetermined increment time period and determine a new performance score for the frames within the incremented moving time window. The system may continuously increment the moving time window to determine performance scores at different portions of a video. The system may present the performance scores for the different portions of the video that correspond to the moving time window on a user interface, in some cases at a location next to the video, and change the performance scores as the moving time window moves to illustrate to a user how the performance of the video changes over time. Thus, a user may more easily see whether a video gets better or worse over time and which portions of the video may need to be adjusted for better performance.

In some embodiments, the system may generate a heat map overlay video based on the performance scores as described above. For example, the system may determine the impact different features of frames of a video had on the performance score for the respective frames. The system may generate heat maps (e.g., heat maps containing colors for any combination of positive, negative, or neutral contributing features of the frames) for each of the frames and aggregate or combine the heat maps together to create a heat map overlay video illustrating the impact that different portions of a video had on the performance score for the video. The system may place the heat map overlay video over the video to generate an evaluation video illustrating how different portions of the video affect the video's performance score.

In some embodiments, the system may train a machine learning model (e.g., a recurrent model or a transformer) to determine a performance score for a sequence of images of a video (e.g., any portion or all of a video). The system may train the machine learning model using engagement metric data as described above. For example, the system may receive a sequence of images of a video of a fixed size and execute a machine learning model simulating a target audience using features extracted from the sequence of images. The machine learning model may output a performance score for the image indicating how the machine learning model predicts the sequence of images will perform with the target audience. The system may retrieve or determine an engagement metric for the sequence of images based on interactions with the sequence of images (or the video associated with the sequence of images) in a similar manner to how the engagement metric is determined for individual images as described above. The system may use backpropagation techniques based on a difference between the performance score and the engagement metric to train the machine learning model to predict performance scores for sequences of images instead of just individual images.

Advantageously, by training a machine learning model to predict performance scores for sequences of images instead of just individual images, the system may use characteristics of the sequence of images that would not necessarily apply to individual images. For example, for a sequence of images, the system may use characteristics of the sequence such as the number of images in the sequence, the amount of time the sequence of images would take to play, movement of objects between images of the sequence, audio characteristics that correspond to the sequence of images, etc. A feature extraction machine learning model may extract such features from the sequence of images as well as other features of the individual images and the system may generate a feature vector using the extracted features. The system may apply the generated feature vector to the machine learning model to determine a score for the sequence and, in some cases, display the score at a user interface. Moreover, in some embodiments, the system may determine scores for multiple sequences of images of a video and determine an average of the determined scores to determine a performance score for the video. Thus, the system may use machine learning techniques to determine scores for videos.

After training a machine learning model to determine performance scores simulating a target audience for videos, the system may use a video analysis technique similar to the image analysis technique described above to determine the impacts different features have on the performance scores for different sequences of images. For example, after determining the performance score for a sequence of images, the system may extract the weights or probabilities from the machine learning model and use back-propagation techniques to determine the impact different features of the sequence of images had on the performance score. The system may generate different visual indications of the impact each feature had and present the visual indications on a user interface. Such visual indications may include alphanumerical text describing the impact (e.g., words and/or numbers indicating whether the feature had a positive, negative, or neutral impact and the magnitude of the impact) or a heat map video overlay that can be placed over the sequence of images similar to the overlays described above. The system may perform similar techniques for the same sequence of images using machine learning models that simulate different target audiences, in some cases upon receiving a selection of the different target audiences, to provide users with an easy-to-use graphic illustrating how different aspects of sequences of images would perform.

Such video analysis techniques can be used at different production stages from video design to post-production evaluation. In one example, given the cost of video production, any insight prior to a commercial video shoot can be helpful. A user can learn about the interest of a target audience based on performance scores of different videos or sequences of images. The user may identify the features of the sequence of images and/or videos that had the strongest positive impact and attempt to make a video that included such features while avoiding features that had a negative or small impact. In another example, after creating a video, a user may use video analysis techniques provided herein as a post-production tool on changes or edits to make to the video. For instance, the system may determine the impact different features in a sequence of images of a video had on the sequence's performance score. The system may present the determined impact on a user interface that enables a user to see the impact that individual features had on the performance score so the user can change the sequence to increase the sequence's score by adding features that positively impact the score and/or removing features that negatively impact or have no or a minimal impact on the score. The user may repeatedly adjust the sequence of images and re-upload the adjusted sequence to obtain a new performance score and/or performance analysis until determining the sequence has a score that is high enough to be published (e.g., used in a commercial, published online, etc.).

In some embodiments, the system may implement a recommendation engine that evaluates the results of the performance score evaluation output (e.g., the data that is illustrated in the visual indicators of the impacts different features had on the performance score) for a piece of content (e.g., an image, a video, a sequence of images, an audio file, etc.). The recommendation engine may include a set of rules or algorithms (e.g., a machine learning model algorithm) that can determine recommendations for how to improve a piece of content to increase the content's score. For example, the recommendation engine may evaluate the extracted data indicating the impact different features had on determining the performance score for an image or sequence of images against a set of rules containing rules that correspond to different recommendations (e.g., how to change different attributes (features) of the content, images to include or exclude from the content, a recommended visual flow of the content, a pace of the content, sounds to include in the content, whether to make the content shorter, different transformations to the content that should be made, etc.). The recommendation engine may make any recommendations. The recommendation engine may identify the rule that was satisfied and/or the recommendation that corresponds to the satisfied rule and generate a record (e.g., a file, document, table, listing, message, notification, etc.) indicating the recommendation. The system may transmit the record to a client device being accessed by a user so the user may change or adjust the content according to the recommendation and increase the content's score.

In some embodiments, the system may identify a recommended transformation for a piece of content and adjust the content based on the recommended transformation. For example, the system may recommend changing a color in a video or image from green to red to improve the performance score for the video or image. The system may change the color from green to red according to the recommendation, thus automatically improving the content's score. The system may make any number of such transformations, such as removing or adding content to a video, moving objects on an image around the image, changing the audio of an audio file or video, etc. Thus, the system may use the output from the input layer of a machine learning model to automatically determine adjustments to make to a piece of content to improve the performance score for the content.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for improved explainability of a neural network, comprising:
   receiving, by one or more processors, an image or video comprising a set of pixels;
   extracting, by the one or more processors, a plurality of features from the image or video;
   generating, by the one or more processors, a feature vector including the plurality of features each at different index values of the feature vector, each of the plurality of features corresponding to a different pixel or subset of pixels of the set of pixels of the image or video;
   executing, by the one or more processors, a neural network using the plurality of features to obtain a performance score for the image or video, the neural network comprising an input layer, a plurality of intermediate layers subsequent to the input layer, and a regression layer or a classification layer subsequent to the plurality of intermediate layers;

extracting, by the one or more processors, one or more values from one or more signals between an intermediate layer of the plurality of intermediate layers and the regression layer or the classification layer, the one or more values generated responsive to executing the neural network using the extracted plurality of features;

back-propagating, by the one or more processors, a set of the extracted one or more values through the plurality of intermediate layers and the input layer;

extracting, by the one or more processors, an impact score for each of the plurality of features from the input layer and generated from the back-propagation of the set of the extracted one or more values through the plurality of intermediate layers and the input layer; and assigning, by the one or more processors, an impact score of the extracted impact scores to each pixel and/or subset of pixels of the set of pixels of the image or video based on the pixel or subset of pixels mapping to the same index value of the feature vector as the impact score;

determining, by the one or more processors, (i) a first plurality of pixels of the image or video that correspond to a first color indicating a positive impact to the performance score, and (ii) a second plurality of pixels of the image or video that correspond to a second color indicating a negative impact to the performance score, based on an assignment of a positive impact score to each of the first plurality of pixels and a negative impact score to each of the second plurality of pixels;

generating, by the one or more processors, a heat map overlay comprising the first color at locations of the image or video corresponding to the first plurality of pixels and the second color at locations of the image or video corresponding to the second plurality of pixels; and presenting, at a display of a client device and by the one or more processors, the heat map overlay over the image or video.

2. The method of claim 1, comprising:
generating, by the one or more processors, an evaluation image or video by placing the heat map overlay over the image or video.

3. The method of claim 1, further comprising:
determining, by the one or more processors, whether each of the plurality of features had a positive impact on the performance score, a negative impact on the performance score, or no impact on the performance score.

4. The method of claim 3, wherein determining whether each of the plurality of features had a positive impact on the performance score or a negative impact on the performance score comprises:
determining, by the one or more processors, a magnitude of a positive impact on the performance score or a negative impact on the performance score of a feature of the image or video; and wherein generating the heat map overlay further comprises:
generating, by the one or more processors, the heat map overlay to include a first shade of the first color or a second shade of the second color for the feature selected based on (1) the determined positive impact or negative impact, and (2) the determined magnitude of the determined positive impact or negative impact.

5. The method of claim 1, wherein the neural network comprises the classification layer, the classification layer configured to output a probability for each of a plurality of performance score ranges based on signals received from an intermediate layer of the plurality of intermediate layers, the signals generated based on executing the neural network using the extracted plurality of features;

wherein extracting the one or more values comprises:
extracting, by the one or more processors, the probabilities for the plurality of performance score ranges; and wherein back-propagating the set of the extracted one or more values comprises back-propagating, by the one or more processors, the probabilities through the plurality of intermediate layers and the input layer.

6. The method of claim 1, further comprising:
training, by the one or more processors, the neural network using training data labeled based on feedback from a first target audience;

training, by the one or more processors, a first neural network using training data labeled based on feedback from a second target audience;

executing, by the one or more processors, the first neural network using the plurality of features to obtain a first performance score for the image or video, the first neural network comprising a first input layer, a first plurality of intermediate layers, and a first regression layer or a first classification layer;

extracting, by the one or more processors, one or more values from one or more first signals between a first intermediate layer of the first plurality of intermediate layers and the first regression layer or the first classification layer, the one or more first values generated responsive to executing the first neural network using the extracted plurality of features;

for each of the plurality of features, calculating, by the one or more processors and based on at least one of the one or more first values, a first impact score indicating a first impact the feature had on the first performance score; and generating, by the one or more processors and based on the first impact scores of the plurality of features, first indications indicating an impact different features of the first image or video had on the first performance score.

7. The method of claim 6, wherein generating the first indications comprises generating a heat map overlay by generating the heat map overlay to have a first pattern of colors indicating an impact different portions of the image or video had on the performance score, and wherein generating the heat map overlay comprises generating the first heat map overlay to have a second pattern of colors indicating a first impact different portions of the image or video had on the first performance score.

8. The method of claim 6, further comprising:
presenting, by the one or more processors, a first identifier associated with the first target audience and a second identifier associated with the second target audience on a display, wherein executing the first neural network is performed responsive to receiving a user selection of the second identifier.

9. The method of claim 6, wherein the first target audience comprises individuals having a first common characteristic, and wherein the second target audience comprises individuals having a second common characteristic, and further comprising:

presenting, by the one or more processors, the first characteristic of the first target audience and the second characteristic of the second target audience on a display,
wherein executing the first neural network is performed responsive to receiving a user selection of the second characteristic.

10. The method of claim 1, wherein executing the neural network using the extracted plurality of features to obtain the performance score for the image or video comprises:
obtaining, by the one or more processors, the performance score from an output of the regression layer.

11. A system for improved explainability of a neural network, the system comprising:
one or more hardware processors configured by machine-readable instructions to:
receive an image or video comprising a set of pixels;
extract a plurality of features from the image or video;
generate a feature vector including the plurality of features each at different index values of the feature vector, each of the plurality of features corresponding to a different pixel or subset of pixels of the set of pixels of the image or video;
execute a neural network using the plurality of features to obtain a performance score for the image or video, the neural network comprising an input layer, a plurality of intermediate layers subsequent to the input layer, and a regression layer or a classification layer subsequent to the plurality of intermediate layers;
extract one or more values from one or more signals between an intermediate layer of the plurality of intermediate layers and the regression layer or the classification layer, the one or more values generated responsive to executing the neural network using the extracted plurality of features;
back-propagate a set of the extracted one or more values through the plurality of intermediate layers and the input layer;
extract an impact score for each of the plurality of features from the input layer and generated from the back-propagation of the set of the extracted one or more values through the plurality of intermediate layers and the input layer;
assign an impact score of the extracted impact scores to each pixel and/or subset of pixels of the set of pixels of the image or video based on the pixel or subset of pixels mapping to the same index value of the feature vector as the impact score;
determine (i) a first plurality of pixels of the image or video that correspond to a first color indicating a positive impact to the performance score, and (ii) a second plurality of pixels of the image or video that correspond to a second color indicating a negative impact to the performance score, based on an assignment of a positive impact score to each of the first plurality of pixels and a negative impact score to each of the second plurality of pixels;
generate a heat map overlay comprising the first color at locations of the image or video corresponding to the first plurality of pixels and the second color at locations of the image or video corresponding to the second plurality of pixels; and
present, at a display of a client device the heat map overlay over the image or video.

12. The system of claim 11,
wherein the one or more hardware processors are further configured by machine-readable instructions to:
generate an evaluation image or video by placing the heat map overlay over the image or video.

13. The system of claim 11, wherein the one or more hardware processors are further configured by machine-readable instructions to:
determine whether each of the plurality of features had a positive impact on the performance score or a negative impact on the performance score.

14. The system of claim 13, wherein the one or more hardware processors are configured by machine-readable instructions to determine whether each of the plurality of features had a positive impact on the performance score or a negative impact on the performance score by:
determining a magnitude of a positive impact on the performance score or a negative impact on the performance score of the feature; and
wherein the one or more hardware processors are further configured by machine-readable instructions to generate the heat map overlay by:
generating, by the one or more processors, the heat map overlay to include a first shade of the first color or a second shade of the second color for the feature selected based on (1) the determined positive impact or negative impact, and (2) the determined magnitude of the determined positive impact or negative impact.

15. A non-transitory computer-readable storage medium for improved explainability of a neural network, the non-transitory computer-readable storage medium having instructions embodied thereon, the instructions being executable by one or more processors to perform a method, the method comprising:
receiving an image or video comprising a set of pixels;
extracting a plurality of features from the image or video;
generating a feature vector including the plurality of features each at different index values of the feature vector, each of the plurality of features corresponding to a different pixel or subset of pixels of the set of pixels of the image or video;
executing a neural network using the plurality of features to obtain a performance score for the image or video, the neural network comprising an input layer, a plurality of intermediate layers subsequent to the input layer, and a regression layer or a classification layer subsequent to the plurality of intermediate layers;
extracting one or more values from one or more signals between an intermediate layer of the plurality of intermediate layers and the regression layer, the one or more values generated responsive to executing the neural network using the extracted plurality of features;
back-propagating a set of the extracted one or more values through the plurality of intermediate layers and the input layer;
extracting an impact score for each of the plurality of features from the input layer and generated from the back-propagation of the set of the extracted one or more values through the plurality of intermediate layers and the input layer;
assigning an impact score of the extracted impact scores to each pixel and/or subset of pixels of the set of pixels of the image or video based on the pixel or subset of pixels mapping to the same index value of the feature vector as the impact score;
determining (i) a first plurality of pixels of the image or video that correspond to a first color indicating a positive impact to the performance score, and (ii) a second plurality of pixels of the image or video that correspond to a second color indicating a negative impact to the performance score, based on an assignment of a positive impact score to each of the first plurality of pixels and a negative impact score to each of the second plurality of pixels;

generating a heat map overlay comprising the first color at locations of the image or video corresponding to the first plurality of pixels and the second color at locations of the image or video corresponding to the second plurality of pixels; and presenting, at a display of a client device, the heat map overlay over the image or video.

16. The non-transitory computer-readable storage medium of claim 15, further comprising:

generating, by the one or more processors, an evaluation image or video by placing the heat map overlay over the image or video.

17. The non-transitory computer-readable storage medium of claim 15, wherein the method comprises:

determining whether each of the plurality of features had a positive impact on the performance score or a negative impact on the performance score.

\* \* \* \* \*